United States Patent
Nara et al.

(10) Patent No.: US 9,406,104 B2
(45) Date of Patent: Aug. 2, 2016

(54) IMAGE PROCESSING SYSTEM, METHOD OF OPERATING IMAGE PROCESSING SYSTEM, HOST APPARATUS, PROGRAM, AND METHOD OF MAKING PROGRAM

(75) Inventors: Yusuke Nara, Itami (JP); Takashi Sawada, Suita (JP); Yukihiro Ukai, Suita (JP); Motoyasu Tanaka, Minoh (JP); Eizi Kawai, Kyoto (JP); Kenichi Mae, Kusatsu (JP)

(73) Assignees: MegaChips Corporation, Osaka-shi (JP); Nontendo Co., Ltd., Kyoto-shi (JP)

( * ) Notice: Subject to any disclaimer, the term of this patent is extended or adjusted under 35 U.S.C. 154(b) by 427 days.

(21) Appl. No.: 13/885,104

(22) PCT Filed: Oct. 13, 2011

(86) PCT No.: PCT/JP2011/073500
§ 371 (c)(1),
(2), (4) Date: May 13, 2013

(87) PCT Pub. No.: WO2012/081299
PCT Pub. Date: Jun. 21, 2012

(65) Prior Publication Data
US 2013/0235035 A1 Sep. 12, 2013

(30) Foreign Application Priority Data
Dec. 16, 2010 (JP) .................................. 2010-280351

(51) Int. Cl.
*G06T 5/00* (2006.01)
*G06T 15/00* (2011.01)
(Continued)

(52) U.S. Cl.
CPC . *G06T 5/00* (2013.01); *G06T 15/00* (2013.01); *H04N 19/115* (2014.11);
(Continued)

(58) Field of Classification Search
None
See application file for complete search history.

(56) References Cited

U.S. PATENT DOCUMENTS 5,263,136 A * 11/1993 DeAguiar et al. ............ 345/538
5,321,811 A * 6/1994 Kato et al. .................... 345/520
(Continued)

FOREIGN PATENT DOCUMENTS

JP 11 252570 9/1999
JP 11 298890 10/1999
(Continued)

OTHER PUBLICATIONS

Office Action issued Oct. 29, 2013 in Japanese Patent Application No. 2010-280351 with English language translation.
(Continued)

*Primary Examiner* — Joni Richer
(74) *Attorney, Agent, or Firm* — Oblon,McClelland, Maier & Neustadt, L.L.P

(57) ABSTRACT

An image processing system includes an image coding device serving as a host device that outputs image data, and an image decoding device serving as a client device and including a display part that displays an image based on image data transmitted from the image coding device. The image coding device includes an image quality controller that controls the image quality of an image displayed on the display part in accordance with an operation status A of the image processing system. When the operation status is a status under which a delay of displaying an image which is caused by transmission of image data from the image coding device to the image decoding device is allowed, the image quality controller increases the image quality of an image displayed on the display part.

44 Claims, 12 Drawing Sheets

(51) Int. Cl.
*H04N 21/442* (2011.01)
*H04N 21/6379* (2011.01)
*H04N 19/149* (2014.01)
*H04N 19/115* (2014.01)
*H04N 19/124* (2014.01)
*H04N 19/17* (2014.01)

(52) U.S. Cl.
CPC .......... *H04N 19/124* (2014.11); *H04N 19/149* (2014.11); *H04N 19/17* (2014.11); *H04N 21/44209* (2013.01); *H04N 21/6379* (2013.01); *A63F 2300/534* (2013.01); *A63F 2300/535* (2013.01); *A63F 2300/538* (2013.01); *A63F 2300/552* (2013.01)

(56) References Cited

U.S. PATENT DOCUMENTS

| | | | |
|---|---|---|---|
| 5,432,900 A * | 7/1995 | Rhodes et al. | 715/202 |
| 6,081,278 A * | 6/2000 | Chen | 345/473 |
| 7,538,780 B2 * | 5/2009 | Ota et al. | 345/619 |
| 7,698,652 B2 * | 4/2010 | Sagar | 715/787 |
| 2001/0026585 A1 * | 10/2001 | Kumaki | 375/240.01 |
| 2002/0080881 A1 | 6/2002 | Honda et al. | |
| 2002/0144697 A1 * | 10/2002 | Betz | 128/920 |
| 2002/0150123 A1 * | 10/2002 | Ro | 370/465 |
| 2003/0044077 A1 * | 3/2003 | Okada | 382/239 |
| 2003/0177500 A1 * | 9/2003 | Nakamura et al. | 725/105 |
| 2003/0193602 A1 * | 10/2003 | Satoh et al. | 348/333.12 |
| 2004/0240744 A1 | 12/2004 | Honda et al. | |
| 2006/0274955 A1 | 12/2006 | Honda et al. | |
| 2007/0038772 A1 | 2/2007 | Obata | |
| 2007/0046666 A1 * | 3/2007 | Kokojima | G06T 15/50 345/427 |
| 2007/0211055 A1 * | 9/2007 | Stein et al. | 345/428 |
| 2009/0172754 A1 * | 7/2009 | Furukawa | 725/91 |
| 2009/0228779 A1 * | 9/2009 | Williamson et al. | 715/233 |
| 2009/0292799 A1 * | 11/2009 | Eisener et al. | 709/223 |
| 2011/0078681 A1 * | 3/2011 | Li et al. | 718/1 |
| 2011/0148899 A1 * | 6/2011 | Dumbeck et al. | 345/589 |
| 2012/0131453 A1 * | 5/2012 | Pechanec et al. | 715/702 |

FOREIGN PATENT DOCUMENTS

| | | |
|---|---|---|
| JP | 2007 49513 | 2/2007 |
| JP | 2007 336260 | 12/2007 |
| WO | 2007 125574 | 11/2007 |

OTHER PUBLICATIONS

International Preliminary Report on Patentability issued on Jun. 27, 2013 in PCT/JP2011/073500 filed Oct. 13, 2011.
Written Opinion issued on Nov. 8, 2011 in PCT/JP2011/073500 filed Oct. 13, 2011 with English translational.
International Search Report issued Nov. 8, 2011 in PCT/JP11/073500 filed Oct. 13, 2011.

* cited by examiner

F I G. 4

| KIND OF IMAGE QUALITY MODE | KIND OF CODING CONDITION (THE NUMBER OF UNIT PROCESSING BLOCKS) |
|---|---|
| HIGH IMAGE QUALITY MODE | CODING CONDITION EC1 (THE NUMBER OF BLOCKS CORRESPONDS TO ONE FRAME) |
| MIDDLE IMAGE QUALITY MODE | CODING CONDITION EC2 (THE NUMBER OF BLOCKS CORRESPONDS TO 2/3 FRAME) |
| LOW IMAGE QUALITY MODE | CODING CONDITION EC3 (THE NUMBER OF BLOCKS CORRESPONDS TO 1/3 FRAME) |

TB1

IMAGE PROCESSING SYSTEM, METHOD OF OPERATING IMAGE PROCESSING SYSTEM, HOST APPARATUS, PROGRAM, AND METHOD OF MAKING PROGRAM

TECHNICAL FIELD

The present invention relates to a technique of transmitting image data.

BACKGROUND ART

In a case of transmitting image data between two devices, a compression process (coding process) is generally performed on the image data in order to suppress a transmission band (for example, Patent Document 1). As a scheme for compressing image data, for example, compression schemes such as H.264 and MPEG (Moving Picture Experts Group)-4 are adopted. However, these compression schemes are irreversible compression schemes. Therefore, an image based on the image data, which is obtained as a result of an expansion process performed on the image data in a device having received the image data, is an image having a deteriorated image quality.

A delay time caused as a result of transmission of image data and the image quality of the transmitted image are correlated with each other. Shortening the delay time results in a deteriorated image quality, while an increased delay time is required in order to maintain an image quality.

PRIOR-ART DOCUMENTS

Patent Documents

Patent Document 1: Japanese Patent Application Laid-Open No. 11-298890 (1999)

SUMMARY OF THE INVENTION

Problems to be Solved by the Invention

Here, in transmission of image data between devices, a delay caused as a result of transmission of image data may be sometimes unallowable. For example, in a system configured such that, when a user who has visually checked an image on a receiver-side device having received image data performs some input operation on the receiver-side device, an image reflecting the input operation is acquired from a transmitter-side device and displayed; it is preferable that a response to the input operation performed by the user is quickly obtained from the viewpoint of the user friendliness.

In such a system, transmission of image data is performed in such a manner that a suppressed delay time is caused as a result of the transmission of image data. Therefore, an image whose image quality is deteriorated is displayed on the receiver-side device.

Therefore, an object of the present invention is to provide a technique that can improve the image quality of an image displayed based on transmitted image data, without impairing the user friendliness due to a delay caused as a result of the transmission of image data.

Means for Solving the Problems

A first aspect of an image processing system according to the present invention includes: a host device that outputs image data; and a client device including a display part that displays an image based on the image data transmitted from the host device. The host device includes image quality control means for controlling an image quality of an image displayed on the display part in accordance with an operation status of the image processing system. When the operation status is a status under which a delay of displaying an image which is caused by transmission of image data from the host device to the client device is allowed, the image quality control means increases the image quality of an image displayed on the display part.

A second aspect of the image processing system according to the present invention is the first aspect, in which the image quality control means included in the host device includes: image quality set means for setting an image quality level of an image displayed on the display part in accordance with the operation status, and outputting image quality information concerning the image quality level that has been set; coding condition set means for setting a coding condition that is used in coding, based on the image quality information; and coding means for performing a coding process on the image data based on the coding condition. In the operation status under which the delay of displaying an image is allowed, the image quality set means outputs the image quality information for increasing the image quality level.

A third aspect of the image processing system according to the present invention is the second aspect, in which the coding condition set means identifies a unit coding area based on the image quality information outputted from the image quality set means and outputs the unit coding area as the coding condition, the unit coding area being a region within one frame of image data and indicating a range of management of the amount of generated codes generated by coding. The coding means includes: code amount control means for determining a target amount of codes per one macro block based on the coding condition and controlling a quantization parameter, the macro block being obtained as a result of dividing one frame into a plurality of regions; and quantization means for performing a quantization process by using a quantization step that is determined in accordance with the quantization parameter, and generating coded image data.

A fourth aspect of the image processing system according to the present invention is the third aspect, in which the code amount control means determines the target amount of codes per one macro block included in the unit coding area such that the amount of generated codes for the unit coding area falls within a total target amount of codes for the unit coding area.

A fifth aspect of the image processing system according to the present invention is any of the second to fourth aspects, in which: the client device includes decoding means for performing a decoding process on image data transmitted from the host device, and the image processing system separately and sequentially performs, on a unit coding area basis, the coding process, a transmission process of transmitting image data from the host device to the client device, and the decoding process.

A sixth aspect of the image processing system according to the present invention is any of the second to fifth aspects, in which the operation status under which the delay of displaying an image is allowed includes a status in which a scene to be viewed and listened to is displayed on the display part.

A seventh aspect of the image processing system according to the present invention is the sixth aspect, in which: the host device includes a storage part that stores a program for playing the scene to be viewed and listened to; an image quality set command for increasing the image quality level is incorporated in the program; and when the image quality set command is issued as a result of execution of the program, the image quality set means sets the image quality level in response to the image quality set command.

An eighth aspect of the image processing system according to the present invention is the seventh aspect, in which: the program for playing the scene to be viewed and listened to is configured as a function; and an API (Application Program Interface) of the function is released to a programmer.

A ninth aspect of the image processing system according to the present invention is the sixth aspect, in which: the host device includes a storage part that stores a program for playing the scene to be viewed and listened to; in a source code of the program for playing the scene to be viewed and listened to, a name of the scene to be viewed and listened to is written as a comment; a preprocessor that performs a preprocess prior to compiling converts the comment concerning the name of the scene to be viewed and listened to into a source code of an image quality set command for increasing the image quality level; and the image quality set means sets the image quality level in response to the image quality set command that includes an object code generated from the source code and that is issued as a result of execution of the program.

A tenth aspect of the image processing system according to the present invention is any of the second to fifth aspects, in which the operation status under which the delay of displaying an image is allowed includes a status in which a specific genre of application software that requires a thinking time of a user who is visually checking the display part is in execution.

An eleventh aspect of the image processing system according to the present invention is the tenth aspect, in which: the host device includes a storage part that stores a function for issuing an image quality set command in accordance with a genre of application software; the function is used in the application software of the specific genre; in the application software of the specific genre, the specific genre is set as a parameter of the function; and when the image quality set command for increasing the image quality level is issued as a result of execution of the application software of the specific genre, the image quality set means sets the image quality level in response to the image quality set command.

A twelfth aspect of the image processing system according to the present invention is the eleventh aspect, in which an API of the function for issuing the image quality set command in accordance with a genre of application software is released to a programmer.

A thirteenth aspect of the image processing system according to the present invention is the tenth aspect, in which: the host device includes a storage part that stores a first function and a second function, the first function being executed in an initialization process of application software, the second function being for issuing the image quality set command in accordance with a genre of application software that is set in a parameter of the first function; the first function is used in the application software of the specific genre; in the application software of the specific genre, the specific genre is set as the parameter of the first function; the second function is executed as a result of execution of the first function; and when the image quality set command for increasing the image quality level is issued as a result of execution of the application software of the specific genre, the image quality set means sets the image quality level in response to the image quality set command.

A fourteenth aspect of the image processing system according to the present invention is the thirteenth aspect, in which an API of the first function is released to a programmer.

A fifteenth aspect of the image processing system according to the present invention is the tenth aspect, in which: in a source code of the application software of the specific genre, the specific genre is written as a comment; a preprocessor that performs a preprocess prior to compiling converts the comment concerning the specific genre into a source code of the image quality set command for increasing the image quality level; and the image quality set means sets the image quality level in response to the image quality set command that includes an object code generated from the source code and that is issued as a result of execution of the application software of the specific genre.

A sixteenth aspect of the image processing system according to the present invention is any of the second to fifth aspects, in which the operation status under which the delay of displaying an image is allowed includes a status in which the host device is reading data.

A seventeenth aspect of the image processing system according to the present invention is the sixteenth aspect, in which: the host device includes a storage part that stores a program for executing read-out of data; an image quality set command for increasing the image quality level is incorporated in the program; and when the image quality set command is issued as a result of execution of the program, the image quality set means sets the image quality level in response to the image quality set command.

An eighteenth aspect of the image processing system according to the present invention is the seventeenth aspect, in which: the program for executing read-out of data is configured as a function; and an API of the function is released to a programmer.

A nineteenth aspect of the image processing system according to the present invention is any of the sixteenth to eighteenth aspects, in which the status in which the host device is reading data includes a status in which the host device is reading data from an external storage medium that is attached to the host device.

A twentieth aspect of the image processing system according to the present invention is any of the second to fifth aspects, in which: the client device includes operation detection means for detecting a user's operation on the client device; and the operation status under which the delay of displaying an image is allowed includes a status in which the amount of user's operation detected by the operation detection means is equal to or less than a predetermined amount.

A twenty-first aspect of the image processing system according to the present invention is the twentieth aspect, in which: the client device transmits information detected by the operation detection means, which serves as operation information, to the host device; and in a case where a non-operation period identified based on the operation information is equal to or longer than a predetermined period, the image quality set means outputs the image quality information for increasing the image quality level.

A twenty-second aspect of the image processing system according to the present invention is the twentieth or twenty-first aspect, in which: the operation detection means includes a detection sensor that detects a movement of the client device caused by a user; the client device transmits, to the host device, the operation information including information detected by the detection sensor; and in a case where the amount of movement of the client device identified based on the information detected by the detection sensor remains unchanged over a predetermined time period, the image quality set means increases the image quality level.

A twenty-third aspect of the image processing system according to the present invention is the twentieth aspect, in which: the client device transmits information detected by the operation detection means, which serves as operation information, to the host device; the host device includes operation monitor means for monitoring a user's operation on the client device based on the operation information; and in a case where the amount of user's operation is equal to or larger than a predetermined amount, the operation monitor means outputs an image quality set command for lowering the image quality level, and in a case where the amount of user's operation is less than the predetermined amount, the operation monitor means outputs an image quality set command for increasing the image quality level.

A twenty-fourth aspect of the image processing system according to the present invention is any of the second to twenty-third aspects, in which the image quality set means outputs image quality information for lowering the image quality level at a time point prior to a time point when the operation status is changed from an operation status under which the delay of displaying an image is allowed to an operation status under which the delay of displaying an image is not allowed.

A twenty-fifth aspect of the image processing system according to the present invention is any of the twentieth to twenty-fourth aspects, in which: the host device includes a storage part that stores a program for executing a predetermined event at a time point prior to a scene change time point at which a scene is changed from a scene not requesting a user's operation to a scene requesting a user's operation; an image quality set command for lowering the image quality level is incorporated in the program; and when the image quality set command is issued as a result of execution of the program, the image quality set means sets the image quality level in response to the image quality set command.

A twenty-sixth aspect of the image processing system according to the present invention is the twenty-fifth aspect, in which: the program for executing the predetermined event is configured as a function; and an API of the function is released to a programmer.

A twenty-seventh aspect of the image processing system according to the present invention is any of the twentieth to twenty-fourth aspects, in which: the host device includes a storage part that stores a program for executing an event at a scene change time point at which a scene is changed from a scene not requesting a user's operation to a scene requesting a user's operation; a source code of the program for executing an event at the scene change time point includes a special command for, when the source code is compiled, placing an image quality set command for lowering the image quality level at a time point a predetermined time period prior to the scene change time point; and when the image quality set command is issued as a result of execution of the program that includes an object code generated by compiling of the source code, the image quality set means sets the image quality level in response to the image quality set command.

A twenty-eighth aspect of the image processing system according to the present invention is the twenty-seventh aspect, in which: the program for executing an event at the scene change time point is configured as a function; and an API of the function is released to a programmer.

A twenty-ninth aspect of the image processing system according to the present invention is any of the second to fifth aspects, in which: the client device includes operation detection means for detecting a user's operation on the client device; the client device transmits information detected by the operation detection means, which serves as operation information, to the host device; and the operation status under which the delay of displaying an image is allowed includes a status in which the host device is set such that the host device does not accept an instruction based on the operation information.

A thirtieth aspect of the image processing system according to the present invention is the twenty-ninth aspect, in which: the host device includes a storage part that stores a program for preventing acceptance of an instruction based on the operation information; an image quality set command for increasing the image quality level is incorporated in the program; and when the image quality set command is issued as a result of execution of the program, the image quality set means sets the image quality level in response to the image quality set command.

A thirty-first aspect of the image processing system according to the present invention is the thirtieth aspect, in which: the program for preventing acceptance of an instruction based on the operation information is configured as a function; and an API of the function is released to a programmer.

A thirty-second aspect of the image processing system according to the present invention is any of the second to fifth aspects, in which: the host device includes image generation means for generating a 3D image; the client device includes operation detection means for detecting a user's operation on the client device; and the operation status under which the delay of displaying an image is allowed includes a status in which the position of a viewpoint of viewing the 3D image generated by the image generation means is moving and additionally the operation detection means has not detected a user's operation in a predetermined period prior to occurrence of the movement of the position of the viewpoint.

A thirty-third aspect of the image processing system according to the present invention is the thirty-second aspect, in which: the client device transmits information detected by the operation detection means, which serves as operation information, to the host device; in a case where viewing transformation that continuously changes the position of the viewpoint is performed in generation of a 3D image, the image generation means outputs, to the image quality set means, a signal indicating that the position of the viewpoint is continuously changing; and in a case where a user's operation performed in a predetermined period prior to reception of the signal indicating that the position of the viewpoint is continuously changing is not detected based on the operation information, the image quality set means outputs the image quality information for increasing the image quality level.

A thirty-fourth aspect of the image processing system according to the present invention is any of the second to fifth aspects, in which: the host device includes image generation means for generating a 3D image; the client device includes operation detection means for detecting a user's operation on the client device; the client device transmits information detected by the operation detection means, which serves as operation information, to the host device; in a case where viewing transformation that continuously changes the position of the viewpoint is performed in generation of a 3D image, the image generation means outputs, to the image quality set means, a signal indicating that the position of the viewpoint is continuously changing; and in a case where a user's operation performed in a predetermined period prior to reception of the signal indicating that the position of the viewpoint is continuously changing is detected based on the operation information, the image quality set means outputs the image quality information for lowering the image quality level.

A thirty-fifth aspect of the image processing system according to the present invention is the first aspect, in which the image quality control means included in the host device includes: image quality set means for setting an image quality level of an image displayed on the display part in accordance with the operation status, and outputting image quality information concerning the image quality level that has been set; and coding means for performing a coding process on the image data based on the image quality information, and the coding means includes: code amount control means for identifying a unit coding area based on the image quality information, determining a target amount of codes per one macro block based on the unit coding area, and controlling a quantization parameter, the unit coding area being a region within one frame of image data and indicating a range of management of the amount of generated codes generated by coding, the macro block being obtained as a result of dividing one frame into a plurality of regions; and quantization means for performing a quantization process by using a quantization step that is determined in accordance with the quantization parameter, and generating coded image data.

A thirty-sixth aspect of the image processing system according to the present invention is the first aspect, in which the image quality control means included in the host device includes: delay time set means for setting an allowable delay time in displaying an image on the display part in accordance with the operation status, and outputting delay time information concerning the allowable delay time that has been set; and coding means for performing a coding process on the image data based on the delay time information, and the coding means includes: code amount control means for identifying a unit coding area based on the delay time information, determining a target amount of codes per one macro block based on the unit coding area, and controlling a quantization parameter, the unit coding area being a region within one frame of image data and indicating a range of management of the amount of generated codes generated by coding, the macro block being obtained as a result of dividing one frame into a plurality of regions; and quantization means for performing a quantization process by using a quantization step that is determined in accordance with the quantization parameter, and generating coded image data.

A first aspect of a host device according to the present invention includes: output means for generating image data of an image to be displayed on a display part of a client device, and outputting the image data; and image quality control means for controlling an image quality of an image displayed on the display part in accordance with an operation status of an image processing system that includes the host device and the client device. The image quality control means increases the image quality of the image when the operation status is a status under which a delay of displaying an image which is caused by transmission of image data from the host device to the client device is allowed.

A first aspect of a method for operating an image processing system according to the present invention is a method for operating an image processing system including a host device that outputs image data and a client device having a display part that displays an image based on the image data transmitted from the host device. The method includes the steps of: (a) in the host device, recognizing an operation status of the image processing system; and (b) in a case where an operation status under which a delay of displaying an image which is caused by transmission of image data from the host device to the client device is allowed is recognized in the step (a), increasing an image quality of an image displayed on the display part.

A second aspect of the method for operating the image processing system according to the present invention is the first aspect of the operation method, in which the step (b) includes: an image quality set step for setting an image quality level of an image displayed on the display part in accordance with the operation status recognized in the step (a), and outputting image quality information concerning the image quality level that has been set; a coding condition set step for setting a coding condition that is used in coding, based on the image quality information; and a coding step for performing a coding process on the image data based on the coding condition. In the image quality set step, the image quality information for increasing the image quality level is outputted in the operation status under which the delay of displaying an image is allowed.

A third aspect of the method for operating the image processing system according to the present invention is the second aspect of the operation method, in which: in the coding condition set step, a unit coding area is identified based on the image quality information outputted in the step (b-1) and the unit coding area is outputted as the coding condition, the unit coding area being a region within one frame of image data and indicating a range of management of the amount of generated codes generated by coding; and the coding step includes: a code amount control step for determining a target amount of codes per one macro block based on the coding condition and controlling a quantization parameter, the macro block being obtained as a result of dividing one frame into a plurality of regions; and a quantization step for performing a quantization process by using a quantization step that is determined in accordance with the quantization parameter, and generating coded image data.

A fourth aspect of the method for operating the image processing system according to the present invention is the third aspect of the operation method, in which in The code amount control step, the target amount of codes per one macro block included in the unit coding area is determined such that the amount of generated codes for the unit coding area falls within a total target amount of codes for the unit coding area.

A fifth aspect of the method for operating the image processing system according to the present invention is any of the second to fourth aspects of the operation method, further including a decoding step for performing, in the client device, a decoding process on image data transmitted from the host device. In the image processing system, the coding process, a transmission process of transmitting image data from the host device to the client device, and the decoding process are separately and sequentially performed on a unit coding area basis.

A sixth aspect of the method for operating the image processing system according to the present invention is any of the second to fifth aspects of the operation method, in which in the image quality set step, image quality information for lowering the image quality level is outputted at a time point prior to a time point when the operation status is changed from an operation status under which the delay of displaying an image is allowed to an operation status under which the delay of displaying an image is not allowed.

A first aspect of a program according to the present invention is a program that causes a computer to execute a process. The computer being built in a host device of an image processing system including the host device that outputs image data and a client device having a display part that displays an image based on the image data transmitted from the host device. The process includes the steps of: when an operation status of the image processing system is a status under which a delay of displaying an image which is caused by transmission of image data from the host device to the client device is allowed, issuing an image quality set command for increasing an image quality level of an image displayed on the display part; and setting the image quality level in response to issuance of the image quality set command.

A first aspect of a method for making a program according to the present invention is a method for making a program stored in a storage part of a host device of an image processing system including the host device that outputs image data and a client device having a display part that displays an image based on the image data transmitted from the host device. The method includes the steps of: by a preprocessor that performs a preprocess prior to compiling, converting a comment indicating a name of a scene to be viewed and listened to, which is written in a source code of a program for playing the scene to be viewed and listened to, into a source code of an image quality set command for increasing an image quality level of an image displayed on the display part; and by compiling, generating from the source code a program including an object code of the image quality set command for increasing the image quality level.

A second aspect of a method for making the program according to the present invention is a method for making a program stored in a storage part of a host device of an image processing system including the host device that outputs image data and a client device having a display part that displays an image based on the image data transmitted from the host device. The method includes the steps of: by a preprocessor that performs a preprocess prior to compiling, converting a comment indicating a specific genre, which is written in a source code of application software of the specific genre, into a source code of an image quality set command for increasing an image quality level of an image displayed on the display part; and by compiling, generating from the source code a program including an object code of the image quality set command for increasing the image quality level.

A third aspect of the method for making the program according to the present invention is a method for making a program stored in a storage part of a host device of an image processing system including the host device that outputs image data and a client device having a display part that displays an image based on the image data transmitted from the host device. The method includes the step of compiling a source code of a program that executes an event at a scene change time point at which a scene is changed from a scene not requesting a user's operation to a scene requesting a user's operation. The source code includes a special command for executing the step so that an image quality set command for lowering an image quality level of an image displayed on the display part is placed at a time point a predetermined time period prior to the scene change time point.

Effects of the Invention

The present invention can improve the image quality of an image displayed based on transmitted image data, without impairing the user friendliness due to a delay caused as a result of the transmission of image data.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 A table showing the relationship between an image quality mode and a coding conditions FIG. 5 A diagram for explaining a coding process performed in the image coding device.

EMBODIMENTS FOR CARRYING OUT THE INVENTION

In the following, an embodiment of the present invention will be described with reference to the drawings.

1. Embodiment 1-1. Outline

Figure 1:
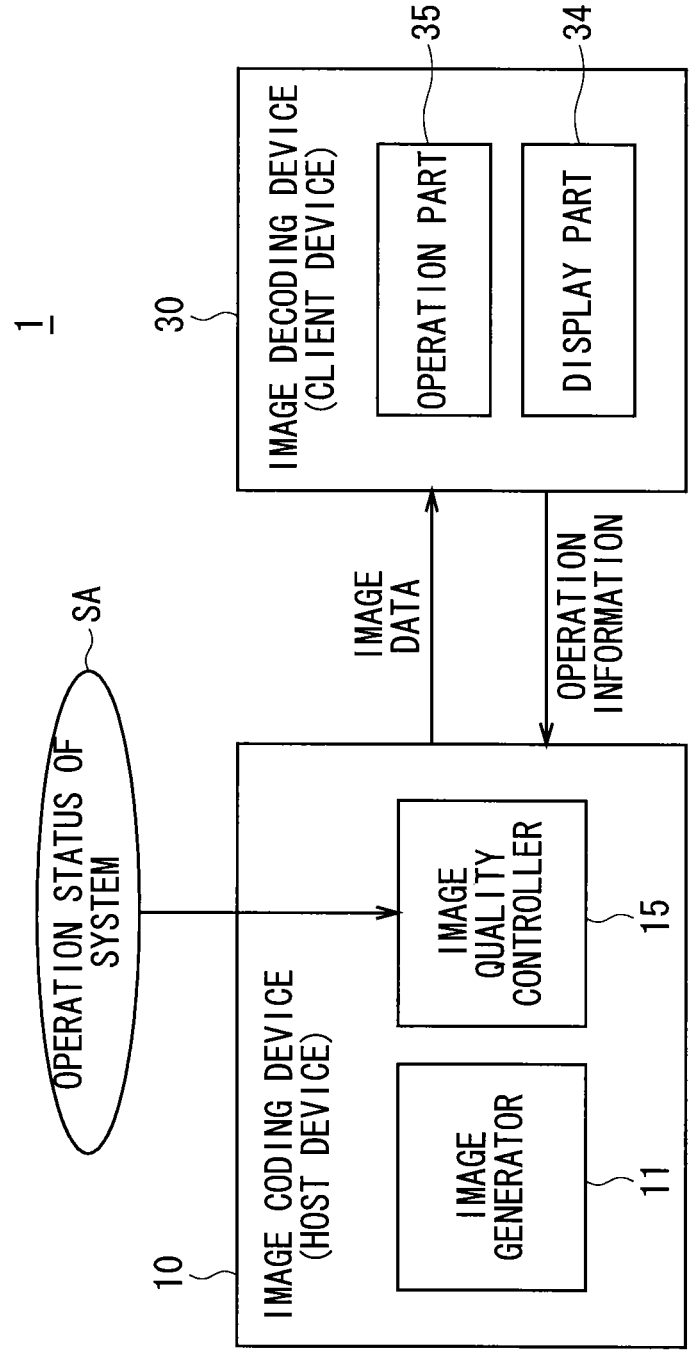
FIG. 1 A diagram showing an outline configuration of an image processing system according to an embodiment of the present invention.

FIG. 1 is a diagram showing an outline configuration of an image processing system 1 according to an embodiment of the present invention.

As shown in FIG. 1, the image processing system 1 includes an image coding device 10 and an image decoding device 30.

The image coding device 10 of the image processing system 1 codes image data generated by an image generator 11. The image data coded by the image coding device 10 is transmitted from the image coding device 10 to the image decoding device 30 through communication means (output means) such as wired communication or wireless communication. The image data transmitted to the image decoding device 30 is decoded by the image decoding device 30, and displayed on a display part 34.

The image processing system 1 of this embodiment includes an image quality controller 15 for controlling the image quality of an image that is displayed on the display part 34. The image quality controller 15 detects an operation status SA of the image processing system 1 and, in accordance with the detected operation status SA, controls the image quality of an image that is displayed on the display part 34.

In the image processing system 1, operation information a user (operator) has inputted via an operation part 35 of the image decoding device 30 is transmitted from the image decoding device 30 to the image coding device 10 through the communication means, and the image processing system 1 performs an operation in accordance with the operation information.

In the image processing system 1, the image coding device 10 functions as a host device that serves as the core of processing within the system. The image decoding device 30 functions as a client device that operates with use of a function, data, or the like, provided by the host device. Accordingly, in the image processing system 1, for example, a plurality of image decoding devices 30 may be provided to one image coding device 10. In such a case, image data is transmitted from the one image coding device 10 to the plurality of image decoding devices 30.

As an example of the image processing system 1, a game system is assumed. In the game system, the image coding device 10 operates as a gaming machine main body and the image decoding device 30 operates as an operation terminal machine (also referred to simply as "operation terminal" or "terminal"). A game operator can enjoy a game by giving an instruction operation to the operation terminal while visually checking an image displayed on a display part of the operation terminal.

In the following, details of the image processing system 1 will be described based on the assumption that the image processing system 1 is a game system. It is to be noted that the image processing system 1 includes not only a system such as a game system which is required to give a response to an operation performed by a user having visually checked the display part, but also other systems in which no time lag (delay) is allowed relative to a display of an image on the display part.

In the specification herein, to avoid unnecessarily complicating the description, both of the image data of an image and the image itself are expressed by the same term "image", as long as it causes no confusion. In the specification herein, the term "image" is used to express a concept that encompasses both of a still image and a moving image.

1-2. Configuration

Figure 2:
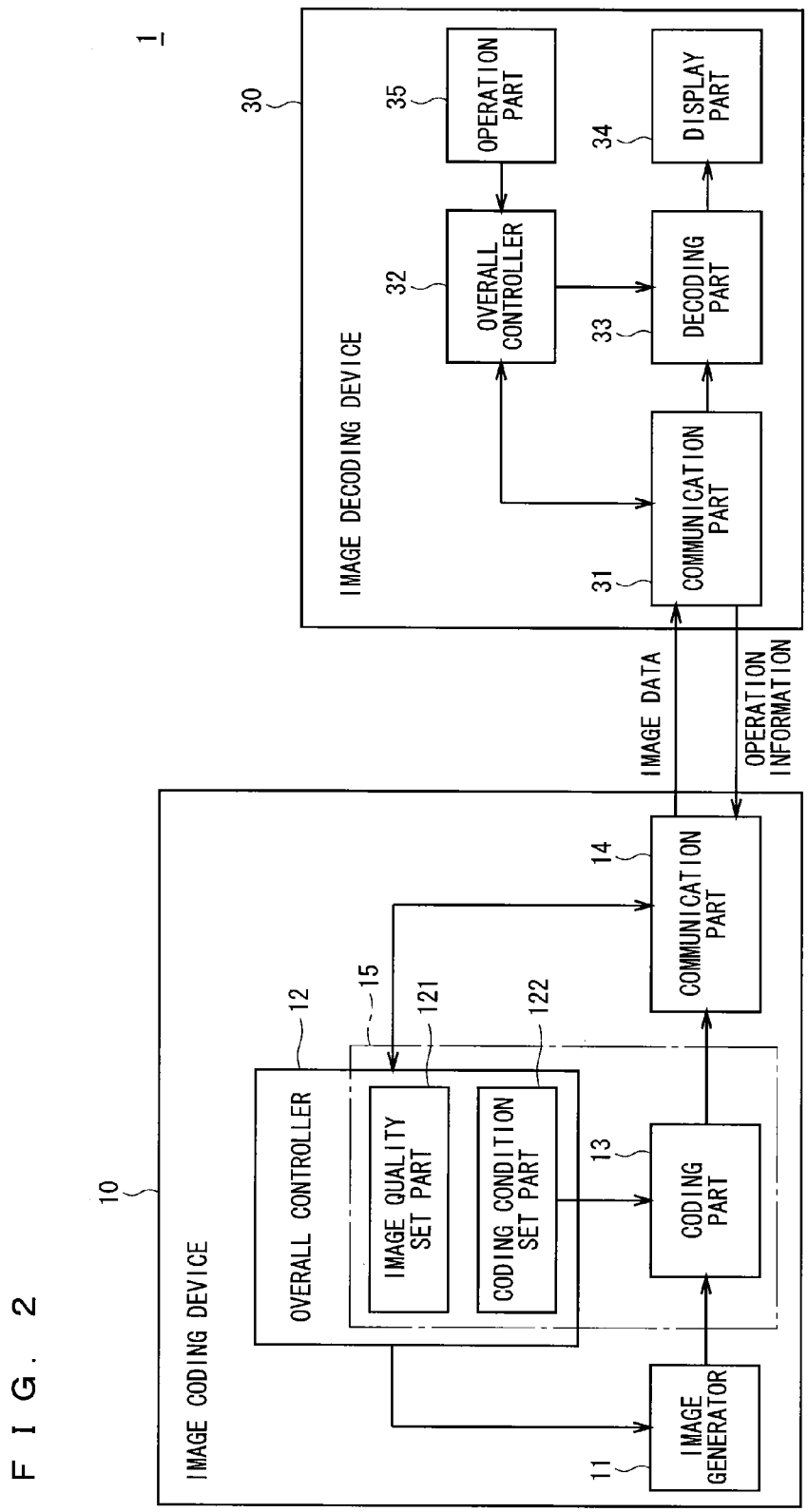
FIG. 2 A diagram showing specific configurations of an image coding device and an image decoding device included in the image processing system.

Next, specific configurations of the image coding device 10 and the image decoding device 30 included in the image processing system 1 will be described in detail. FIG. 2 is a diagram showing specific configurations of the image coding device 10 and the image decoding device 30 included in the image processing system 1.

As shown in FIG. 2, the image coding device 10 includes an image generator 11, an overall controller 12, a coding part 13, and a communication part 14.

The image generator 11 is configured of a GPU (Graphic Processing unit), and has a function for sequentially generating image data of images that form a moving image. The GPU is a semiconductor chip that is designed to specialize particularly in image processing as compared in a general-purpose CPU. The GPU is, separately from a normal CPU, mounted to the image coding device 10. The image data generated by the image generator 11 is outputted to the coding part 13. The image generator 11 is also able to generate image data of a moving image by using image data stored in an external storage medium (not shown) such as a memory card or a CD-ROM mounted to the image coding device 10.

The coding part (also referred to as "encoder") 13 performs a compression process (also referred to as "coding process") having a predetermined moving image compression scheme on the image data received from the image generator 11, thereby generating compressed image data. As the moving image compression scheme, for example, H.264, MPEG (Moving Picture Experts Group)-2, or MPEG-4 is adopted. A detailed configuration of the coding part 13 will be described later.

The compressed image data generated by the coding part 13 is inputted to the communication part 14, and transmitted to the outside of the image coding device 10 by the communication part 14.

The overall controller 12 is configured of a CPU, a ROM, a RAM, and the like (all of which are not shown), and collectively controls operations of the image coding device 10 and the image processing system 1. The overall controller 12 also functionally implements an image quality set part 121 and a coding condition set part 122 by causing the CPU to execute a program stored in the ROM. The image quality set part 121 and the coding condition set part 122 will be described later.

The image coding device 10 receives from the image decoding device 30 the operation information inputted by the user (operator) who is using the image decoding device 30 as a client device, and analyzes the operation information in the overall controller 12. The overall controller 12 implements various operations in response to the operation information.

On the other hand, the image decoding device 30 includes a communication part 31, an overall controller 32, a decoding part 33, a display part 34, and an operation part 35.

The communication part 31 receives data (transmission data) transmitted from the image coding device 10, and outputs the transmission data to the overall controller 32 or to the decoding part 33. For example, the compressed image data included in the transmission data is outputted to the decoding part 33 by the communication part 31.

The decoding part (also referred to as "decoder") 33 performs an expansion process (also referred to as "decoding process") on the compressed image data, to acquire the image data.

The decoded image data is displayed on the display part 34 that is configured as an LCD (Liquid Crystal Display), an organic EL display, or the like.

The overall controller 32 is configured of a CPU, a ROM, a RAM, and the like (all of which are not shown), and collectively controls operations (such as a communication operation, a decoding process, and a display process) of the image decoding device 30.

The operation part 35 includes a direction selection key, a push button, and the like, and is configured to input the user's instruction operation to the image processing system 1. That is, the operation part 35 functions as operation detection means for detecting an operation the user has performed on the image decoding device 30. The instruction operation inputted through the operation part 35 is analyzed by the overall controller 32, and then operation information in accordance with the instruction operation is outputted to the image coding device 10.

1-3. Detailed Configuration of Coding Part

Figure 3:
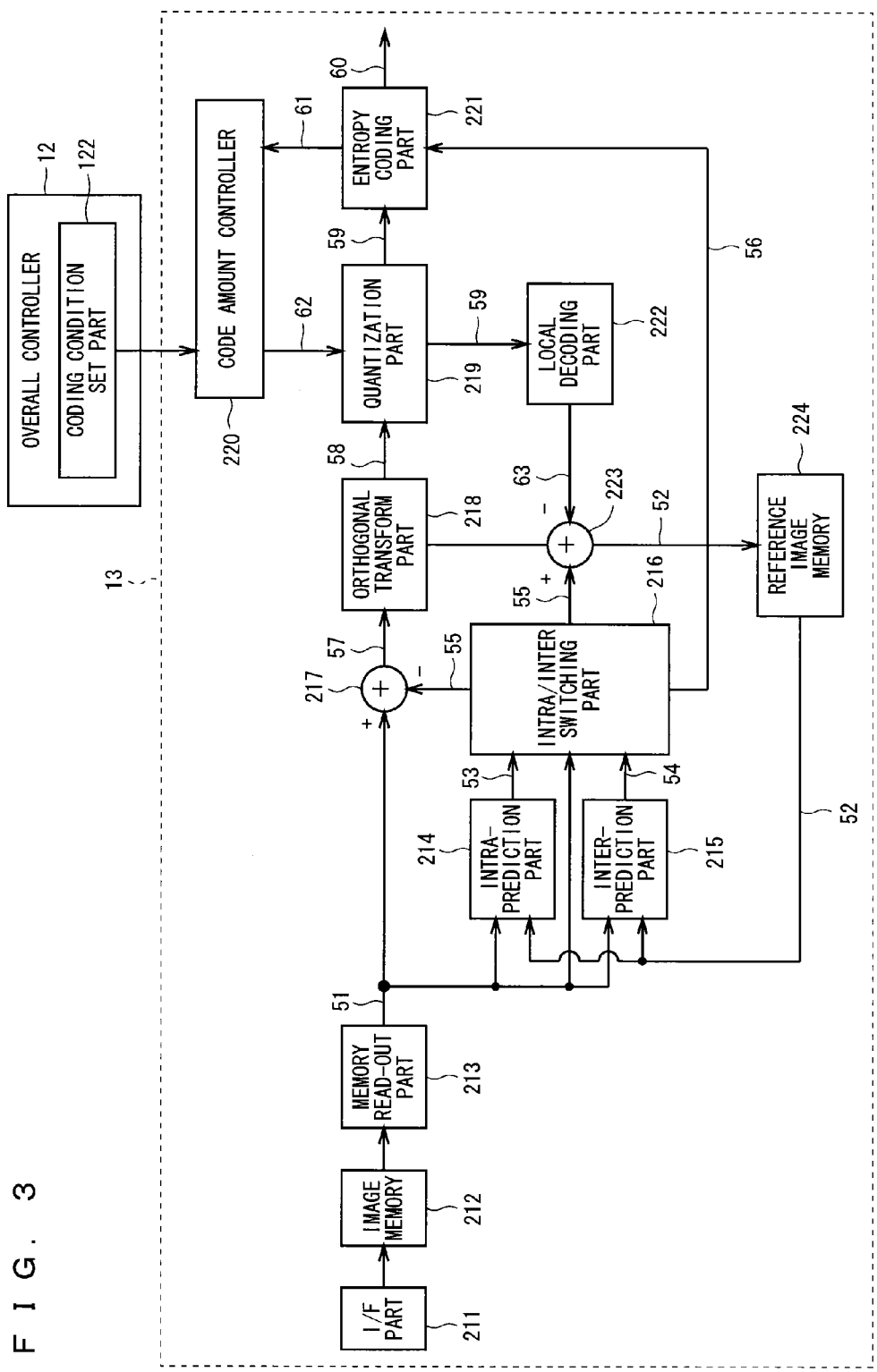
FIG. 3 A block diagram showing a configuration of a coding part.

Next, the coding part 13 of the image coding device 10 will be described in detail. FIG. 3 is a block diagram showing a configuration of the coding part 13.

As shown in FIG. 3, the image data outputted from the image generator 11 is stored in an image memory (frame memory) 212 via an interface (I/F) part 211. The image memory 212 temporarily stores the image data on a frame basis.

Then, a memory read-out part 213 reads out the image data from the image memory 212 on a block basis. The block is obtained by dividing the image into a plurality of regions (for example, a block of 16 pixels×16 pixels). The image data (also referred to as "block image data") 51 that has been read out on a block basis is inputted to the coding part 13 (and more specifically to a difference calculation part 217, an intra-prediction part 214, and an inter-prediction part 215).

In this manner, in the image coding device 10, the image data is read out on a block basis, and the coding process is performed on each block (also referred to as "macro block" or "compression block").

The compression process performed by the coding part 13 of the image coding device 10 is broadly classified into three processes, namely, a prediction image generation process, a residual error signal coding process, and a local decoding process.

The prediction image generation process is implemented by prediction image output means that includes the intra-prediction part 214, the inter-prediction part 215, and an intra/inter switching part 216 shown in FIG. 3.

The intra-prediction part 214 performs an intra-screen prediction, to generate an intra-prediction image. More specifically, the intra-prediction part 214 receives the block image data 51 and a local decoded image 52 of coded data, which are inputted thereto, and then determines a prediction direction that provides the most optimal coding efficiency from candidate prediction directions. Then, the intra-prediction part 214 outputs, as intra information 53, an intra-prediction image (intra-prediction signal) and intra-prediction information (information concerning the prediction direction).

The inter-prediction part 215 performs an inter-screen prediction, to generate an inter-prediction image. More specifically, the inter-prediction part 215 receives the block image data 51 and a local decoded image of coded data, which are inputted thereto, and then determines a motion vector that provides the most optimal coding efficiency. Then, the inter-prediction part 215 outputs, as inter information 54, an inter-prediction image (inter-prediction signal) and inter-prediction information (information concerning the motion vector).

The intra/inter switching part 216 receives the intra information 53, the inter information 54, and the block image data 51, which are inputted thereto. The intra/inter switching part 216 selects either one of the intra information 53 and the inter information 54, and outputs the selected one. The intra/inter switching part 216 calculates a difference value between the intra-prediction image and the block image data 51, and a difference value between the inter-prediction image and the block image data 51. Then, the intra/inter switching part 216 compares the two difference values against each other, and thereby outputs, to a difference calculation part 217 and to an adding calculation part 223, a prediction image 55 that is one of the intra-prediction image and the inter-prediction image whose difference from the block image data is smaller.

The intra/inter switching part 216 also outputs, to an entropy coding part 221, prediction information 56 concerning the outputted prediction image 55. That is, when the intra-prediction image is outputted as the prediction image 55, the intra-prediction information is outputted as the prediction information 56, while when the inter-prediction image is outputted as the prediction image 55, the inter-prediction information is outputted as the prediction information 56.

The residual signal coding process is implemented by the difference calculation part 217, an orthogonal transform part 218, a quantization part 219, a code amount controller 220, and the entropy coding part 221 shown in FIG. 3.

The difference calculation part 217 calculates a difference in the pixel value between the block image data 51 and the prediction image 55, and outputs a residual signal (difference signal) 57 indicating a resulting difference to the orthogonal transform part 218.

The orthogonal transform part 218 performs a so-called discrete cosine transform (DCT), by which the residual signal 57 is orthogonally transformed into a DCT coefficient 58 in a frequency domain. The DCT coefficient 58 obtained as a result of the transform is inputted to the quantization part 219.

The quantization part 219 quantizes the DCT coefficient 58, and thereby the DCT coefficient 58 is transformed into a quantization coefficient 59. Such quantization is achieved by dividing the DCT coefficient 58 by using a quantization step that is determined by the code amount controller 220. The quantization coefficient 59 obtained by the quantization part 219 is inputted to the entropy coding part 221 and to a local decoding part 222.

The entropy coding part 221 performs, for example, a variable-length coding process such as Huffman coding or an arithmetic coding process on the quantization coefficient 59 received from the quantization part 219 and the prediction information 56 received from the intra/inter switching part 216, to thereby generate coding data 60. The coding data 60 is temporarily accumulated in a transmission buffer (not shown), and then outputted as the compressed image data to the outside of the coding part 13. The compressed image data contains information about coding of, for example, the coded prediction information 56. Therefore, a decoding device that receives the compressed image data and reconfigures the image is able to perform decoding by using this information about coding.

The entropy coding part 221 outputs the amount 61 of generated coding data (the amount of generated codes) to the code amount controller 220 at an appropriate time.

The code amount controller 220 functions as information generation means for determining a quantization step that is used for quantization and then outputting the quantization step as quantization information 62 to the quantization part 219. The quantization step indicates the roughness of quantization. A smaller quantization step provides a greater suppression of deterioration in the image quality but increases the amount of codes. The code amount controller 220 controls a quantization parameter having a predetermined relationship with the quantization step, and thereby derives the quantization step. A control of setting of the quantization parameter is performed based on a coding condition that is received from the coding condition set part 122 of the overall controller 12. The control of setting of the quantization parameter will be described later.

The quantization parameter is a variable having a predetermined relationship with the quantization step. For example, in a case of MPEG-2, the quantization parameter is proportional to the quantization step, and in a case of H.264, the quantization parameter is proportional to the logarithm of the quantization step.

The local decoding process is implemented by the local decoding part 222, the adding calculation part 223, and a reference image memory 224 shown in FIG. 3.

The local decoding part 222 performs an inverse quantization process on the quantization coefficient 59, and then performs the calculation (inverse DCT) opposite to the DCT thereon, to output a result of the calculation (the residual signal 63 that has been reconfigured). The adding calculation part 223 performs an adding process on the result of the calculation of the local decoding part 222 by using the prediction image 55 generated by the intra-prediction part 214 or the inter-prediction part 215, and then outputs the local decoded image (also referred to as "reference image") 52 obtained as a result of the adding process. The local decoded image is temporarily accumulated in the reference image memory 224.

As thus far described, the coding part 13 performs the intra-screen prediction or the inter-screen prediction based on the image data generated by the image generator 11, and codes this image data.

1-4. Regarding Image Quality Control

As described above, the image processing system 1 includes the image quality controller 15 for controlling the image quality of an image that is displayed on the display part 34 in accordance with the operation status of the image processing system 1. FIG. 4 is a table showing the relationship between an image quality mode and the coding condition.

As shown in FIG. 2, the image quality controller 15 is a function part achieved by the coding part 13 cooperating with the image quality set part 121 and the coding condition set part 122 that are functionally implemented in the overall controller 12.

More specifically, the image quality set part 121 sets the image quality level of an image that is displayed on the display part 34, in accordance with the operation status of the image processing system 1. The setting of the image quality level is performed by, for example, changing a mode (image quality mode) concerning the image quality level. In the image processing system 1, for example, three kinds of the image quality mode are provided, namely, a high image quality mode, a middle image quality mode, and a low image quality mode. The image quality set part 121 selects one kind from these plurality of kinds of the image quality mode.

The selection of the image quality mode reflects the operation status of the image processing system 1. In the image processing system 1 serving as a game system, in many cases, the operation is performed in a relatively low image quality mode (the low image quality mode or the middle image quality mode), and the image quality mode is shifted from the low image quality mode to a relatively high-side image quality mode (the high image quality mode or the middle image quality mode) in accordance with the operation status.

Examples of the operation status of the image processing system 1 at a time of shifting the image quality mode from the low image quality mode to the high-side image quality mode include: (1) a status in which a scene to be viewed and listened to is displayed on the display part 34; (2) a status in which it is assumed that there is a little input operation performed by the user; (3) a status in which the image coding device 10 is reading data; and (4) a status in which the user does not actually perform an operation on the image decoding device 30.

Each of the operation statuses (1) to (3) is recognized by issuance of an image quality set command that is incorporated in a program (herein, a game program) in execution.

More specifically, when the CPU of the overall controller 12 executes a program and thereby issues an image quality set command that is incorporated in this program, the image quality set part 121 changes the image quality mode in accordance with the image quality set command.

The operation status (4) is a status recognized based on the operation information received from the image decoding device 30. The image quality set part 121 changes the image quality mode in accordance with the user's operation status that is recognized based on the operation information. Details will be described later.

When the image coding device 10 is started up and when the image quality mode is changed, the image quality set part 121 notifies the coding condition set part 122 of information (also referred to as "image quality information") concerning a current image quality level. Here, the image quality mode is used as the image quality information. The notification of the image quality mode is performed by using, for example, a flag assigned to each image quality mode.

Based on the current image quality mode notified from the image quality set part 121, the coding condition set part 122 sets conditions for coding (coding condition). The setting of the coding condition can be performed by using, for example, a table indicating the relationship between the image quality mode and the coding condition. This embodiment illustrates a case of setting the coding condition by using a table TB1 as shown in FIG. 4. In a case of setting the coding condition by using this table TB1, when the current image quality mode is the high image quality mode, a condition EC1 is set as the coding condition. When the current image quality mode is the middle image quality mode, a condition EC2 is set as the coding condition. When the current image quality mode is the low image quality mode, a condition EC3 is set as the coding condition. The coding condition set part 122 is also called a coding information acquisition part that acquires coding information used for coding based on the image quality information.

After the setting of the coding condition is completed, the coding condition set part 122 outputs, to the coding part 13, the coding condition that has been set.

Based on the coding condition received from the coding condition set part 122, the coding part 13 performs the coding process on image data.

Figure 5:
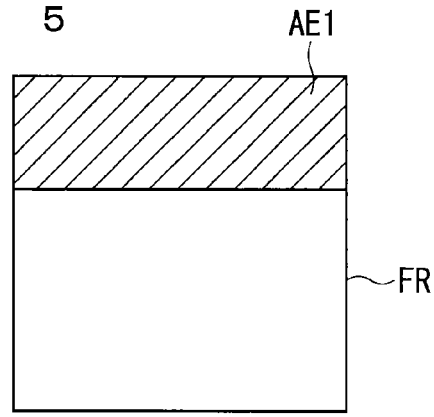
Figure 6:
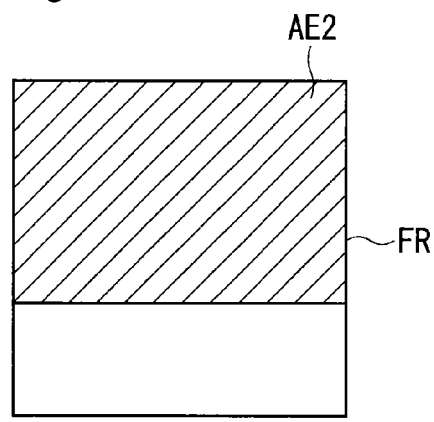
FIG. 6 A diagram for explaining the coding process performed in the image coding device.
Figure 7:
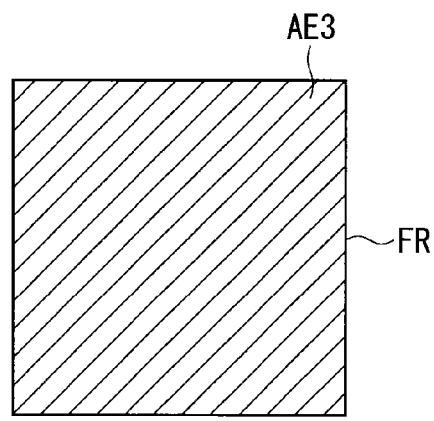
FIG. 7 A diagram for explaining the coding process performed in the image coding device.

The coding process performed in the image coding device 10 will be described in detail. FIGS. 5 to 7 are diagrams for explaining the coding process performed in the image coding device 10.

In the image coding device 10, the coding process is performed while a unit coding area (unit coding region) is changed based on the coding condition received from the coding condition set part 122 of the overall controller 12.

The unit coding area is a region within one frame of the image data, and represents a range of management of the amount of generated codes at a time of performing the coding process. For example, when a region AE1 that occupies ⅓ of one frame FR is set as a processing unit in the coding process as shown in FIG. 5, the ⅓ frame region AE1 constitutes the unit coding area. When a region AE2 that occupies ⅔ of one frame FR is set as the processing unit in the coding process as shown in FIG. 6, the ⅔ frame region AE2 constitutes the unit coding area. When an entire region AE3 of one frame FR is set as the processing unit in the coding process as shown in FIG. 7, the entire region AE3 constitutes the unit coding area.

Such a change in the unit coding area is performed by the code amount controller 220 based on the coding condition that is received from the coding condition set part 122.

More specifically, in this embodiment, the number of macro blocks (also referred to as "the number of unit processing blocks") included in the unit coding area is used as the coding condition. The value set for the number of unit processing blocks is different depending on the coding conditions, and in other words, different depending on the image quality mode. In this embodiment using the table TB1 shown in FIG. 4, in the high image quality mode, the number of unit processing blocks is set to be the number of blocks corresponding to one frame. In the middle image quality mode, the number of unit processing blocks is set to be the number of blocks corresponding to the ⅔ frame. In the low image quality mode, the number of unit processing blocks is set to be the number of blocks corresponding to the ⅓ frame.

As a result, the number of unit processing blocks outputted from the coding condition set part 122 differs depending on the kind of the current image quality mode.

The code amount controller 220 identifies the unit coding area based on the number of unit processing blocks received from the coding condition set part 122. Therefore, when the number of unit processing blocks received from the coding condition set part 122 is changed, the unit coding area identified by the code amount controller 220 is changed. That is, in this embodiment, in the high image quality mode, a region corresponding to one frame is set as the unit coding area; in the middle image quality mode, a region corresponding to the ⅔ frame is set as the unit coding area; and in the low image quality mode, a region corresponding to the ⅓ frame is set as the unit coding area.

Such a change in the unit coding area in performing the coding process results in a change in the image quality of the image data.

To be specific, in performing the coding process, the coding part 13 manages the amount of codes on a unit coding area basis. Thus, in performing the coding process, the coding part 13 controls the target amount of codes (also referred to as "the unit target amount of codes") per one macro block such that the amount of actually generated codes in the unit coding area falls within the total target amount of codes for this unit coding area.

In more detail, the code amount controller 220 multiplies the reference amount of codes per one macro block by the number of macro blocks included in the unit coding area, to thereby obtain the total target amount "TM" of codes for this unit coding area. Based on the amount of generated codes received from the entropy coding part 221, the code amount controller 220 obtains the amount "FA" of generated codes concerning coding-processed macro blocks (processed blocks) among the macro blocks included in the unit coding area.

Then, the code amount controller 220 identifies the number "BN" of macro blocks (unprocessed blocks) on which the coding process has not yet been completed among the macro blocks included in the unit coding area, and then performs calculation of the following expression (1).

[Math. 1]

$$TC = (TM - FA)/BN \quad (1)$$

In the calculation of the expression (1), the amount of generated codes "FA" concerning the processed blocks is subtracted from the total target amount "TM" of codes, and the value obtained as a result of the subtraction is divided by the number "BN" of unprocessed blocks. As a result of this calculation, the code amount controller 220 obtains the target amount "TC" of codes per one macro block.

The code amount controller 220 performs the calculation of the aforementioned expression (1) as appropriate during execution of the coding process to thereby update the target amount of codes per one macro block, and controls the quantization parameter based on the updated target amount of codes per one macro block.

The reference code amount per one macro block can be obtained by dividing the bit transfer rate (for example, 10 Mbps) from the image coding device 10 to the image decoding device 30 by the frame rate (for example, 60 fps) of the moving image and the total number of macro blocks included in one frame.

As described above, in a case where the amount of generated codes is managed on a unit coding area basis in the coding process, increasing the unit coding area to thereby enlarge the average zone for obtaining the target amount of codes per one macro block results in a relatively great value allowable as the peak value of the amount of codes per one macro block.

For example, in a case where the whole of one frame is set as the unit coding area, the total target amount of codes is larger than in a case where the ⅓ frame region is set as the unit coding area. Accordingly, in a case where the whole of one frame is set as the unit coding area, a relatively great value is allowable as the peak value of the amount of codes per one macro block as compared with a case where the ⅓ frame region is set as the unit coding area.

When the unit coding area is increased in this manner, a relatively great value is allowable as the peak value of the amount of codes per one macro block. Therefore, in a case where the unit coding area is large, it is possible that a relatively large amount of codes is assigned to, for example, a specific region within a frame including many high-frequency components than to other regions within the frame. This can reduce deterioration in the image quality of this specific region which is caused by the coding, and consequently can improve the image quality in an image obtained as a result of the decoding process.

On the other hand, in a case where a region smaller than one frame is set as the unit coding area, the value allowable as the peak value of the amount of codes per one macro block is lowered. Therefore, the image quality in an image obtained as a result of the decoding process is lowered.

Figure 8:
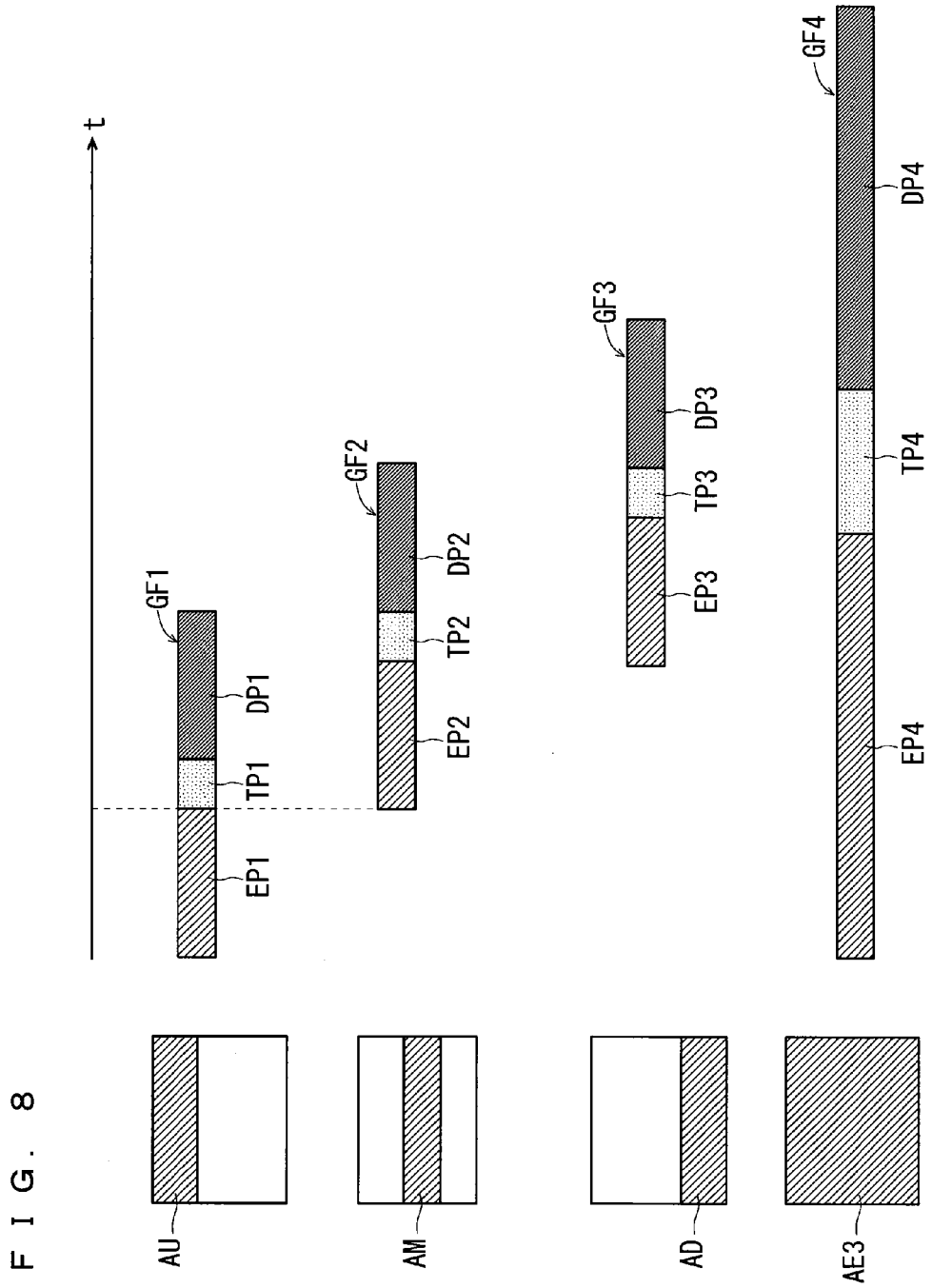
FIG. 8 A diagram showing a transmission operation of transmitting image data from the image coding device to the image decoding device.

In a case where a region smaller than one frame is set as the unit coding area, while the image quality obtained as a result of the coding process is lowered, the image processing system 1 can shorten time required for transmission of image data from the image coding device 10 to the image decoding device 30. FIG. 8 is a diagram showing a transmission operation of transmitting image data from the image coding device 10 to the image decoding device 30.

To be specific, the image coding device 10 temporarily accumulates the compressed image data in the transmission buffer, and at a time point when the coding process on the unit coding area is completed, transmits the compressed image data on a unit coding area basis. Then, the image decoding device 30 decodes the transmitted compressed image data on a unit coding area basis, to obtain the image data.

At this time, the image processing system 1 separately performs the coding process in the image coding device 10, the transmission process of transmitting the compressed image data, and the decoding process in the image decoding device 30. Thereby, the time required for transmission of the image data from the image coding device 10 to the image decoding device 30 is shortened.

For example, a case is assumed in which a region corresponding to the ⅓ frame is set as the unit coding area for performing the coding process as shown in FIG. 8.

In this case, firstly, a coding process EP1 is performed on image data in a region (upper stage region) AU corresponding to a ⅓ frame located in an upper stage of the frame. After the coding process EP1 on the upper stage region AU is completed, a transmission process TP1 of transmitting the compressed image data in the upper stage region AU is performed. The transmission process TP1 transmits the compressed image data in the upper stage region AU from the image coding device 10 to the image decoding device 30. Then, the image decoding device 30 performs a decoding process DP1 on the compressed image data in the upper stage region AU. Upon completion of the decoding process DP1, a transmission operation GF1 (more specifically, the coding process EP1, the transmission process TP1, and the decoding process DP1) on the image data in the upper stage region AU is completed.

In the image coding device 10, after the coding process EP1 on the upper stage region AU is completed, a coding process EP2 starts to be performed on a region (middle stage region) AM corresponding to a ⅓ frame located in the middle stage of the frame. After the coding process EP2 on the middle stage region AM is completed, a transmission process TP2 of transmitting the compressed image data in the middle stage region AM is performed. The transmission process TP2 transmits the compressed image data in the middle stage region AM from the image coding device 10 to the image decoding device 30. Then, the image decoding device 30 performs a decoding process DP2 on the compressed image data in the middle stage region AM. Upon completion of the decoding process DP2, a transmission operation GF2 of transmitting the image data in the middle stage region AM is completed.

Likewise, in the image coding device 10, after the coding process EP2 on the middle stage region AM is completed, a coding process EP3 is started to be performed on a region (lower stage region) AD corresponding to a ⅓ frame located in the lower stage of the frame. After the coding process EP3 on the lower stage region AD is completed, a transmission process TP3 of transmitting the compressed image data in the lower stage region AD is performed. The transmission process TP3 transmits the compressed image data in the lower stage region AD from the image coding device 10 to the image decoding device 30. Then, the image decoding device 30 performs a decoding process DP3 on the compressed image data in the lower stage region AD. Upon completion of the decoding process DP3, a transmission operation GF3 of transmitting the image data in the lower stage region AD is completed.

In this manner, in a case where a region smaller than one frame is set as the unit coding area for performing the coding process, the image processing system 1 performs the transmission operation (the coding process, the transmission process, and the decoding process) of transmitting the image data on a unit coding area basis. After the coding process on a certain unit coding area is completed, the coding process on a next unit coding area is started. In other words, the transmission operation of transmitting image data in the next unit coding area is started. Thus, in the image processing system 1, the coding process, the transmission process, and the decoding process are sequentially performed on a unit coding area basis.

In this configuration, as shown in FIG. 8, the transmission operations of transmitting the image data in unit coding areas are partially concurrently performed in the image processing system 1. Accordingly, in the image processing system 1, in a case where a region smaller than one frame is set as the unit coding area for performing the coding process, the time required for transmission of the image data can be shortened as compared with a case where the entire region AE3 of one frame is set as the unit coding area for performing a transmission operation GF4 (more specifically, a coding process EP4, a transmission process TP4, and a decoding process DP4) of transmitting image data. Herein, the case where the region corresponding to the ⅓ frame is set as the unit coding area and the case where the region corresponding to one frame is set as the unit coding area have been taken as an example to describe shortening of the time required for transmission of image data. As the unit coding area is smaller, the time required for transmission of image data is shortened.

Thus, in the image processing system 1, when performing the coding process, the image coding device 10 changes the unit coding area in accordance with a change in the image quality mode, thereby controlling the image quality.

Shortening of the time required for transmission of image data can shorten a time period from when image data is generated by the image generator 11 of the image coding device 10 to when an image based on this image data is displayed on the display part 34 of the image decoding device 30. The time period from when an image is generated in the image coding device 10 to when this image is displayed on the image decoding device 30 is also called an image-display delay time.

The image quality of the image displayed on the display part 34 is correlated with the delay time. Increasing the unit coding area improves the image quality but increases the delay time. On the other hand, reducing the unit coding area lowers the image quality but shortens the delay time. As for the operation status of the image processing system 1 at a time of shifting the image quality mode from the low image quality mode to the high-side image quality mode, the above-mentioned ones are: (1) the status in which a scene to be viewed and listened to is displayed on the display part 34; (2) the status in which it is assumed that there is a little input operation performed by the user; (3) the status in which the image coding device 10 is reading data; and (4) the status in which the user does not actually perform an operation on the image decoding device 30. These operation statuses (1) to (4) can be also expressed as statuses under which occurrence of a delay of displaying an image caused by transmission of image data from the image coding device 10 to the image decoding device 30 is allowed in the image processing system 1. That is, the image processing system 1 improves the image quality of an image displayed on the display part 34 under the statuses under which delay of displaying an image is allowed, and in other words, in statuses under which an increase in the delay time does not influence the operation of the image processing system 1.

1-5. Regarding the Operation Statuses

Each of the operation statuses (1) to (4) of the image processing system 1 at a time of shifting the image quality mode from the low image quality mode to the high-side image quality mode will be described in detail.

(1) The Status in which the Scene to be Viewed and Listened to is Displayed on the Display Part 34

In the image processing system 1 of this embodiment, in a scene primarily intended to be viewed and not requiring an input operation of the user, the image quality mode is shifted from the low image quality mode to the high-side image quality mode. Examples of the scene to be viewed and listened to include a replay image display scene (replay scene) and a moving image display scene (movie scene). In addition to the replay scene and the movie scene, a menu scene for allowing selection of setting of a game, a help scene for informing a method for operating a game, and the like, can be considered as the scenes to be viewed and listened to.

The status in which a scene to be viewed and listened to is displayed is recognized by the overall controller 12 detecting the image quality set command that is incorporated in the program in execution.

The image quality set command may be included in, for example, a function in a library contained in a software development kit (SDK) that is provided to an application developer (also referred to as "game developer", or simply as "programmer"). In more detail, an image quality set command for shifting the image quality mode to the high-side image quality mode (an image quality set command for increasing the image quality level) may be incorporated in a function (for example, a play movie function) for playing a movie scene or a function (for example, a play replay function) for playing a replay scene.

An application program interface (API) of these functions in the library contained in the SDK is released to the application developer. Therefore, in a development of application software (also referred to as "game program", or simply as "application"), the application developer calls the function in accordance with the released API and makes programming, and thereby can develop an application without caring for adjustment of the image quality (delay) in accordance with a scene. The API is a protocol that defines programming procedures for using the functions in the library.

The image processing system 1 may be configured such that the above-mentioned library is preliminarily stored in the ROM of the image coding device 10. Alternatively, the library as well as the game program may be stored in an external storage medium that is attachable to the image coding device 10 such that the library is provided to the image coding device 10 when the external storage medium is attached to the image coding device 10.

(2) The Status in which it is Assumed that there is a Little Input Operation Performed by the User Examples of the status in which it is assumed that there is a little input operation performed by the user include a status in which there are played specific kinds (specific genres) of games, such as a board game including a Japanese chess game, a puzzle game, and a simulation game, that require a thinking time but require relatively little input operation. Under such a status in which a game program of a specific genre (application software for a specific genre) is in execution, the image display with a higher image quality is demanded rather than shortening of the image-display delay time, because the visibility of characters or objects (pieces of the Japanese chess) displayed on the display part 34 is demanded.

Figure 9:
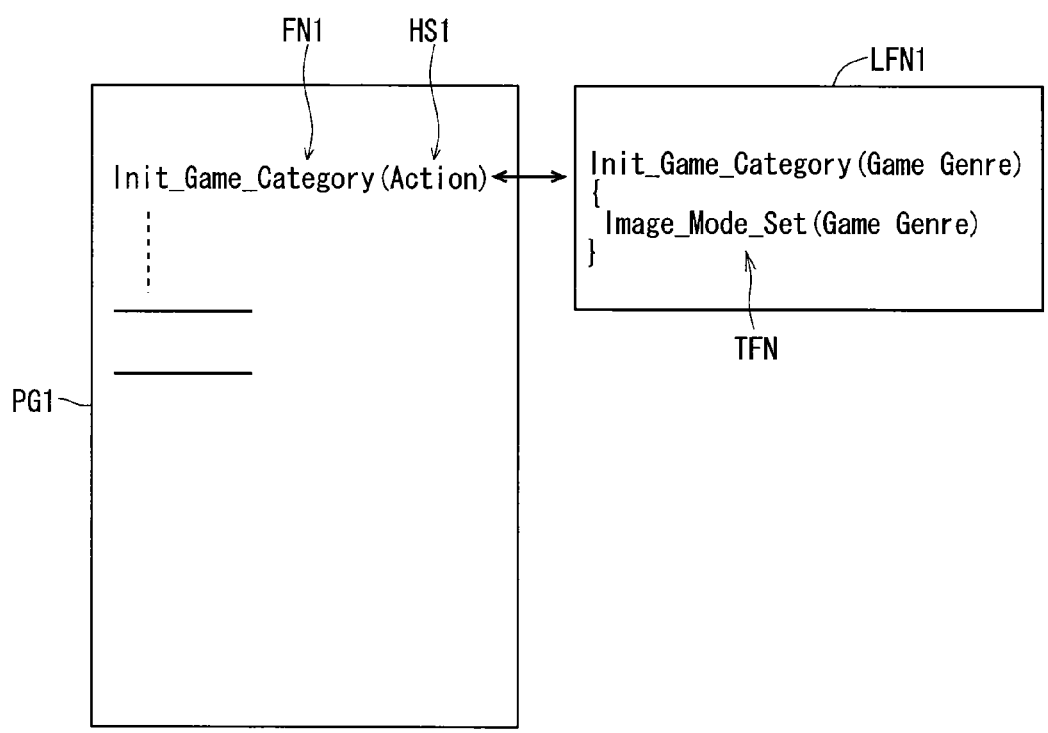
FIG. 9 An exemplary design of a game program.

As a method for issuing an image quality set command for shifting the image quality mode to an image quality mode in accordance with the kind of the game (game genre), for example, the following method is conceivable. That is, as a protocol in making a game program, it is defined that an initial setting function (genre setting function) that declares a game genre should be provided in the game program, and thus the genre setting function that issues the image quality set command is prepared in a library. FIG. 9 is an exemplary design of the game program.

To be specific, as shown in FIG. 9, a genre setting function LFN1 that declares a game genre is prepared in the library. The genre setting function LFN1 is configured such that an image quality set command in accordance with a genre indicated by a parameter HS1 is issued.

In this case, the game developer refers to the released API of the genre setting function, and provides a genre setting function FN1 in a game program PG1 he/she is making, and sets a game genre (such as "Action", "Puzzle", or "RPG") in the parameter HS1 of this genre setting function FN1.

When the genre setting function FN1 is actually executed by the overall controller 12, the genre setting function LFN1 in the library linked to this genre setting function FN1 is called. The genre setting function LFN1 in the library includes a function TFN that issues the image quality set command in accordance with the genre that is set in the parameter HS1 with reference to a table indicating the relationship between the game genre and the image quality set command. Accordingly, calling of the genre setting function LFN1 in the library causes issuance of the image quality set command.

For example, in a case where the kind of the game is Action, the image quality set command for shifting the image quality mode to the low-side image quality mode (the image quality set command for lowering the image quality level) is issued. The image quality set part 121 having received this image quality set command lowers the image quality level. For example, in a case where the game genre is Puzzle, the image quality set command for shifting the image quality mode to the low-side image quality mode is issued. The image quality set part 121 having received this image quality set command lowers the image quality level.

Figure 10:
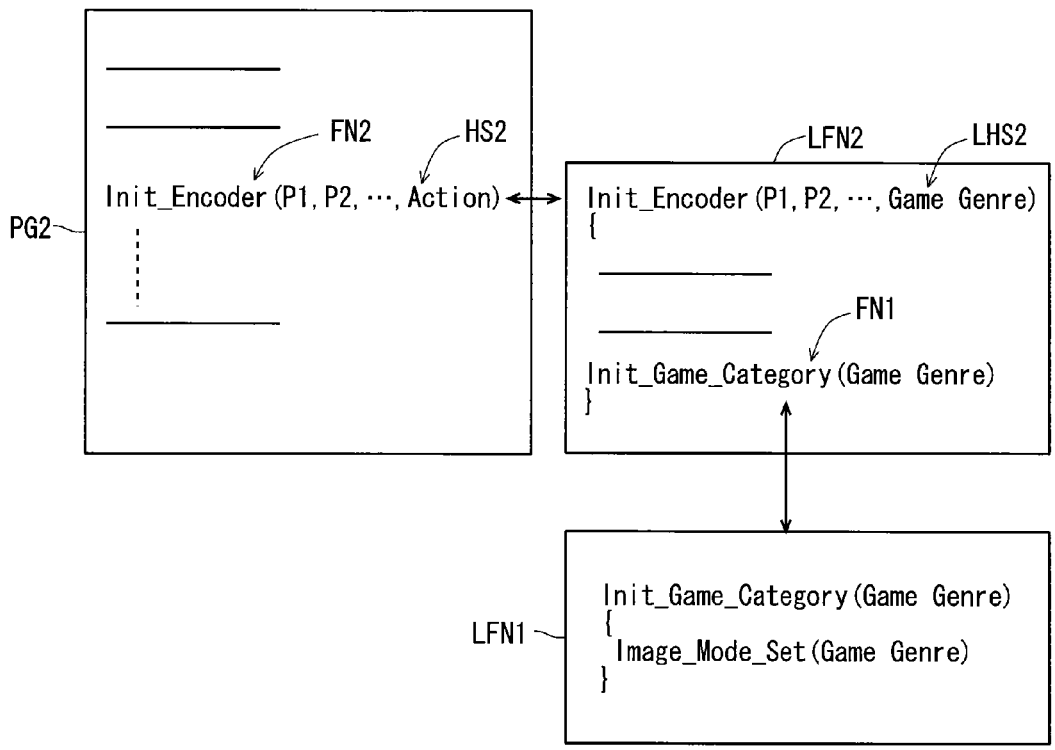
FIG. 10 An exemplary design of the game program.

As another method for issuing the image quality set command for shifting the image quality mode to an image quality mode in accordance with the game genre, for example, the following method is conceivable. That is, the above-mentioned genre setting function FN1 is embedded in a function that is inevitably executed in an initialization process of application software. Examples of the function that is executed in an initialization process of application software include an encoder initial setting function FN2 in which initial setting (initialization) of the encoder 13 is performed. FIG. 10 is an exemplary design of the game program.

To be specific, as shown in FIG. 10, the genre setting function LFN1 that issues the image quality set command is provided in the library. Additionally, the number of parameters in an encoder initial setting function LFN2 in the library is increased by one as compared with the conventional case. That is, a parameter LHS2 concerning the game genre is newly provided. A genre setting function FN1 that issues the image quality set command based on the parameter LHS2 is prepared in the encoder initial setting function LFN2, and the API of the encoder initial setting function LFN2 is released.

In this case, based on the released API, the game developer increases, by one, the number of parameters in the encoder initial setting function FN2 of a game program PG2 he/she is making. Thus, the game developer newly sets a parameter HS2 concerning the game genre.

When the encoder initial setting function FN2 is actually executed by the overall controller 12, the encoder initial setting function LFN2 in the library linked to this encoder initial setting function FN2 is called. When the encoder initial setting function LFN2 in the library is executed, then the genre setting function FN1 embedded in the encoder initial setting function LFN2 is called, so that the image quality set command is issued.

Preliminarily embedding the genre setting function FN1 in the encoder initial setting function LFN2 included in the library can reduce the burden on the game developer. More specifically, in a case where the genre setting function FN1 is preliminarily embedded in the encoder initial setting function LFN2, the game developer newly sets the parameter HS2 of the encoder initial setting function FN2 in the game program PG2 he/she is making. If the game developer fails to set the parameter HS2 when making the game program PG2, a compile error due to a failure to set the parameter occurs at a time of compiling the game program PG2. This can prompt the game developer to set the parameter HS. This can prevent in advance a failure to set the game genre. Thus, the burden on the game developer is reduced.

In a configuration illustrated herein, the genre setting function FN1 serving as a second function is prepared in the encoder initial setting function FN2 serving as a first function, and execution of the first function directly causes execution of the second function. However, this is not limiting. More specifically, in a possible configuration, the second function is prepared in another function included in the first function, and execution of the first function indirectly causes execution of the second function. That is, execution of the second function includes direct and indirect execution achieved by execution of the first function.

Figure 11:
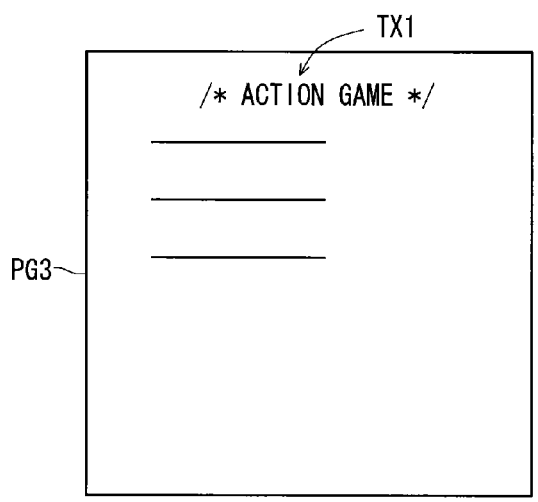
FIG. 11 An exemplary design of the game program.

As another method for issuing the image quality set command for shifting the image quality mode to an image quality mode in accordance with the game genre, for example, the following method is conceivable. That is, a comment concerning a game genre written in the game program is detected, and the image quality set command is issued. FIG. 11 is an exemplary design of the game program.

To be specific, a preprocessor that performs preprocessing before compiling is given a function for converting a comment (character string) concerning a game genre into a source code of the image quality set command for shifting the image quality mode to an image quality mode in accordance with the game genre written in the comment.

In this case, as shown in FIG. 11, the game developer writes a comment TX1 of the game genre in a game program PG3 he/she is making. When this game program PG3 is compiled, an object code in accordance with the above-mentioned source code of the image quality set command is generated. Execution of the game program PG3 by the overall controller 12 causes issuance of the image quality set command for shifting the image quality mode to the image quality mode in accordance with the game genre.

This method for issuing the image quality set command based on the comment contained in the game program is applicable to the above-described method (1) in which the scene to be viewed and listened to is detected and the image quality set command is issued.

To be specific, the preprocessor is given a function for converting a comment concerning a scene (scene name) into a source code of the image quality set command for shifting the image quality mode to an image quality mode in accordance with this scene.

In this case, the game developer writes this scene name as a comment in a source code set describing a certain scene (such as a menu scene or a help scene) in the game program, and when the game program is executed by the overall controller 12, the image quality set command is issued in accordance with the scene.

(3) The Status in which the Image Coding Device 10 is Reading Data

Under the status in which the image coding device 10 is reading data, an input operation performed by the user is often unacceptable, and a delay of displaying an image is allowed.

As a method for issuing the image quality set command for shifting the image quality mode to the high-side image quality mode under the status in which the image coding device 10 is reading data, it is conceivable that the image quality set command for shifting the image quality mode to the high-side image quality mode is incorporated in a function concerning read-out of data.

For example, when an external storage medium is accessed, there is a high possibility that image data acquired from the external storage medium would be subsequently played and displayed. Therefore, the image quality set command for shifting the image quality mode to the high-side image quality mode is incorporated in a function for accessing the external storage medium.

Accordingly, in a case where an access request for access to the external storage medium occurs and a program that has been made by using the API of the function for accessing the external storage medium is executed, the image quality mode is automatically shifted to the high-side image quality mode.

(4) The Status in which the User does not Actually Perform an Operation on the Image Decoding Device 30

Under the status in which the user does not actually perform an operation on the image decoding device 30, it is not necessary to display an image in response to an input operation performed by the user. Therefore, a delay of displaying an image is allowed.

As a method for detecting the status in which the user does not actually perform an operation on the image decoding device 30, for example, a method is adoptable in which a situation where the amount of operation performed by the user is equal to or less than a predetermined amount is detected based on the operation information received from the image decoding device 30.

More specifically, the overall controller 12 detects an operating state of the user based on the operation information received from the image decoding device 30. The overall controller 12 notifies the image quality set part 121 of the detected operating state. The image quality set part 121 identifies a non-operation period based on the notification of the operating state, and variably changes the image quality mode in accordance with the non-operation period.

As a method for variably changing the image quality mode in accordance with the non-operation period, for example, a method is adoptable in which a plurality of different threshold values are provided and the image quality level is increased stepwise each time the non-operation period exceeds any of the threshold values. In this embodiment, since three kinds of image quality modes are provided, the image quality mode is changed stepwise in the order of low image quality mode→middle image quality mode→high image quality mode in accordance with the non-operation period. Stepwise changing the image quality mode in this manner enables the image quality to be changed without giving a visually uncomfortable feeling to the user who is enjoying the game.

Instead of the stepwise change, the image quality mode may be rapidly shifted from the low image quality mode to the high image quality mode at a time point when the non-operation period exceeds a certain threshold value. When an input operation performed by the user is detected and the non-operation period ends, the image quality mode may be rapidly shifted from the high image quality mode to the low image quality mode. Alternatively, the image quality mode may start to be stepwise shifted to the low image quality mode at a time point when the non-operation period ends.

Such a variable change in the image quality mode in accordance with the operation status may be implemented in middleware. In this case, the application developer needs no particular care for a variable change in the image quality mode in accordance with the operation status. Here, the threshold value concerning the non-operation period, which is used for changing the image quality mode, can be set by the game developer on application software, too. In middleware, for example, an operation monitor task which will be described later is implemented, and a variable change in the image quality mode in accordance with the operation status is performed.

As another method for detecting the operation status of the user, for example, the following method may be mentioned.

To be specific, in a case where the image decoding device 30 includes a sensor (movement detection sensor) for detecting a movement, such as a gyro sensor or an acceleration sensor, it may be acceptable to detect a movement of the image decoding device 30 by using this sensor and variably change the image quality mode in accordance with this movement.

For example, when the amount of movement of the image decoding device 30 does not change, it is assumed that the user does not carry the image decoding device 30. When the amount of movement is gradually decreasing, it is assumed that the user does not perform an operation. Accordingly, in a case where the amount of movement remains unchanged over a predetermined time period or in a case where the amount of movement is gradually decreasing, the image quality set part 121 shifts the image quality mode to the high-side image quality mode.

Alternatively, the image quality mode may be changed in accordance with the amount of shaking of the image decoding device 30, the number of times the image decoding device 30 is shaken, the interval of shaking, or the rate of change in the amount of shaking. For example, when the amount of shaking is large, the number of times shaking occurs is large, the interval of shaking is short, or the rate of change in the amount of shaking is large, it is considered that the amount of operation performed by the user is large. Therefore, the image quality mode is shifted to the low image quality mode, to reduce a delay time. On the other hand, when the amount of shaking is small, the number of times shaking occurs is small, the interval of shaking is long, or the rate of change in the amount of shaking is small, it is considered that the amount of operation performed by the user is small. Therefore, the image quality mode is shifted to the high-side image quality mode. At this stage, stepwise performing the shift of the image quality mode can change the image quality without giving a visually uncomfortable feeling to the user. Information of the movement detected by the movement detection sensor is, as the operation information, transmitted from the image decoding device 30 to the image coding device 10.

The movement detection sensor is, similarly to the operation part 35, included in the operation detection means provided in the image decoding device 30. Information detected by the operation detection means is, as the operation information, transmitted to the image coding device 10.

As another method for detecting the operation status of the user, for example, a method is adoptable in which a task (also referred to as "operation monitor task") of monitoring a user's operation (which herein includes the input operation performed through the operation part 35 and the movement of the image decoding device 30 detected by the movement detection sensor) is provided so that the operation status of the user is detected by this task.

To be specific, the operation monitor task (operation monitor means) acquires current scene information and, based on this scene information, acquires the amount of operation (expected amount of operation) expected to be performed by the user in the current scene by using a table that indicates the relationship between the scene and the expected amount of operation.

Then, the operation monitor task outputs the image quality set command in accordance with whether or not the amount of operation (the number of times the operation is performed, the interval of operations, the amount of movement, and the like) actually performed by the user is equal to or larger than the expected amount of operation. In other words, when the amount of operation actually performed by the user is equal to or larger than the expected amount of operation, the image quality set command for shifting the image quality mode to the low image quality mode is outputted. When the amount of operation actually performed by the user is less than the expected amount of operation, the image quality set command for shifting the image quality mode to the high-side image quality mode is outputted.

Particularly in a case where the same operation is repeatedly inputted by the user in the same scene, it is assumed that the user is repeatedly performing the same operation because display of an image in response to the user's operation is delayed. Accordingly, when the operation monitor task has detected the status in which the user repeatedly inputs the same operation in the same scene, the image quality mode is shifted to the low image quality mode, to reduce a delay time.

Figure 12:
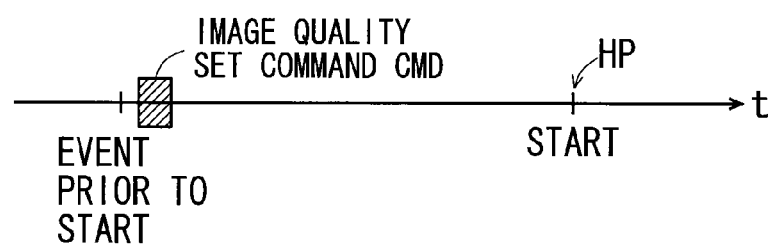
FIG. 12 A diagram for explaining a method for shifting the image quality mode to a low-side image quality mode by a scene change time point.
Figure 13:
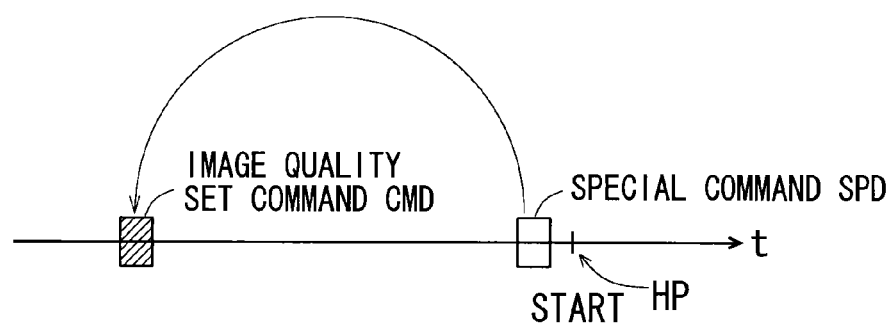
FIG. 13 A diagram for explaining the method for shifting the image quality mode to a low-side image quality mode by the scene change time point.

In some cases, an operation of the user is suddenly requested during a time period in which the image quality mode is being shifted to the high-side image quality mode as a result of detection of the status in which the user does not actually perform an operation. For example, in a racing game, no operation is required before a start, but an operation is requested immediately after the start. In such a case, it is preferable that shift of the image quality mode to the low image quality mode is completed by a time point (also referred to as "scene change time point") when the scene is changed from a scene not requesting a user's operation to a scene requesting a user's operation. FIGS. 12 and 13 are diagrams for explaining a method for shifting the image quality mode to the low image quality mode by the scene change time point.

As a method for shifting the image quality mode to the low image quality mode by the scene change time point, for example, a method is adoptable in which, as shown in FIG. 12, an image quality set command CMD for shifting the image quality mode to the low image quality mode is incorporated in a program or a function that executes an event at a time point prior to a scene change time point HP ("start" in FIG. 12).

Examples of the event occurring at a time point prior to the scene change time point HP include a countdown event that informs a game operator who is playing the racing game of a start timing. In this case, the image quality set command CMD is incorporated in a program or a function that executes the countdown event in order that this image quality set command CMD for shifting the image quality mode to the low image quality mode is issued when countdown for starting a race begins. This enables the image quality mode to be shifted to the low image quality mode by the scene change time point HP.

The scene change time point at which the scene is changed from the scene not requesting a user's operation to the scene requesting a user's operation is also expressed as a time point at which the operation status is changed from an operation status under which a delay of displaying an image is allowed to an operation status under which a delay of displaying an image is not allowed. In the racing game, for example, six signals are sequentially turned on, and a timing when all the signals having been turned on are simultaneously blacked out (turned off) is set as the start timing. In a case of such a racing game, a time when the countdown for starting a race begins means a time when the signals start to be turned on. The function that executes an event at a time point prior to the scene change time point HP may be a function in the library contained in the SDK. In this case, the API of this function is released to the programmer.

As another method for shifting the image quality mode to the low image quality mode by the scene change time point, for example, a method is adoptable in which, as shown in FIG. 13, a special command SPD is incorporated in a program or a function that executes an event at the scene change time point HP. The special command SPD is a command for causing a compiler to place the above-mentioned image quality set command CMD at a time point a predetermined time period prior to the scene change time point HP.

When the program or the function including this special command SPD is compiled, the compiler measures clock counts and places the above-mentioned image quality set command CMD at a time point the predetermined time period prior to the scene change time point HP. This enables the image quality set command CMD to be issued at the time point the predetermined time period prior to the scene change time point HP. Therefore, unlike the method shown in FIG. 12, the game developer does not have to consider which event before the scene change time point HP the image quality set command CMD should be incorporated in. Thus, the method shown in FIG. 13 can reduce the burden on the game developer. The function that executes an event at the scene change time point HP may be a function in the library contained in the SDK. In such a case, the API of this function is released to the programmer.

As thus far described, the image processing system 1 according to this embodiment includes the image coding device 10 serving as a host device that outputs image data, and the image decoding device 30 serving as a client device provided with the display part 34 for displaying an image based on the image data transmitted from the image coding device 10. The image coding device 10 includes the image quality controller 15 for controlling the image quality of an image that is displayed on the display part 34 in accordance with the operation status SA of the image processing system 1. in the operation status SA under which a delay of displaying an image caused by transmission of image data from the image coding device 10 to the image decoding device 30 is allowed, the image quality controller 15 increases the image quality of an image that is displayed on the display part 34.

Accordingly, when the image processing system 1 takes such an operation status that a delay of displaying an image caused by transmission of image data from the image coding device 10 to the image decoding device 30 is allowed, a control is performed to increase the image quality of an image that is displayed on the display part 34. This can improve the image quality of an image that is displayed on the display part 34, without impairing the user friendliness due to a delay caused as a result of the transmission of image data.

2. Modifications

While an embodiment of the present invention has been described, the present invention is not limited to the above-described embodiment.

Figure 14:
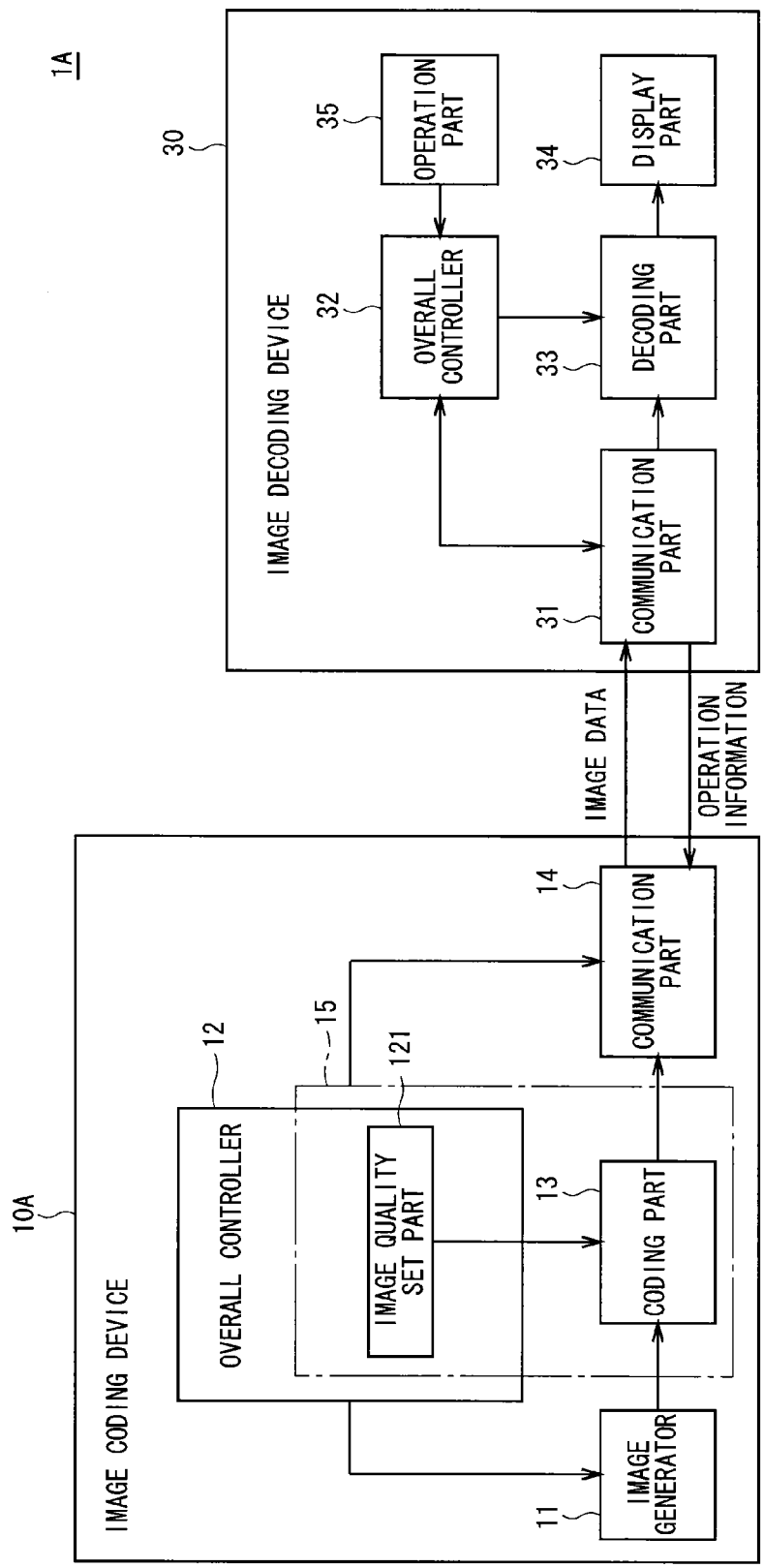
FIG. 14 A diagram showing a specific configuration of an image processing system according to a modification.

For example, in the above-described embodiment, the number of macro blocks included in the unit coding area serves as the coding condition and is inputted to the coding part 13. However, this is not limiting. FIG. 14 is a diagram showing a specific configuration of an image processing system 1A according to a modification.

To be specific, as shown in FIG. 14, in the image processing system 1A, information concerning the image quality level (image quality information) is directly inputted to the coding part 13 (in more detail, to the code amount controller 220).

More specifically, the image processing system 1A has the image quality set part 121 provided in the overall controller 12. The image quality controller 15 of the image processing system 1A is a function part achieved by cooperation of the image quality set part 121 and the coding part 13. The image processing system 1A has the same structure and the same function as those of the image processing system 1 (see FIG. 2) of the above-described embodiment, except that the overall controller 12 of an image coding device 10A does not include the coding condition set part 220. Thus, the common parts are denoted by the common reference signs, and descriptions thereof are omitted.

In the code amount controller 220 that receives the image quality information, the unit coding area is identified based on the received image quality information, and the coding process is performed. The identification of the unit coding area is achieved by using, for example, a table indicating the relationship between the image quality level and the size of the unit coding area. As the image quality information, for example, the image quality mode is adoptable. In a case of adopting the image quality mode, a flag assigned to each of the image quality modes is inputted to the code amount controller 220.

Figure 15:
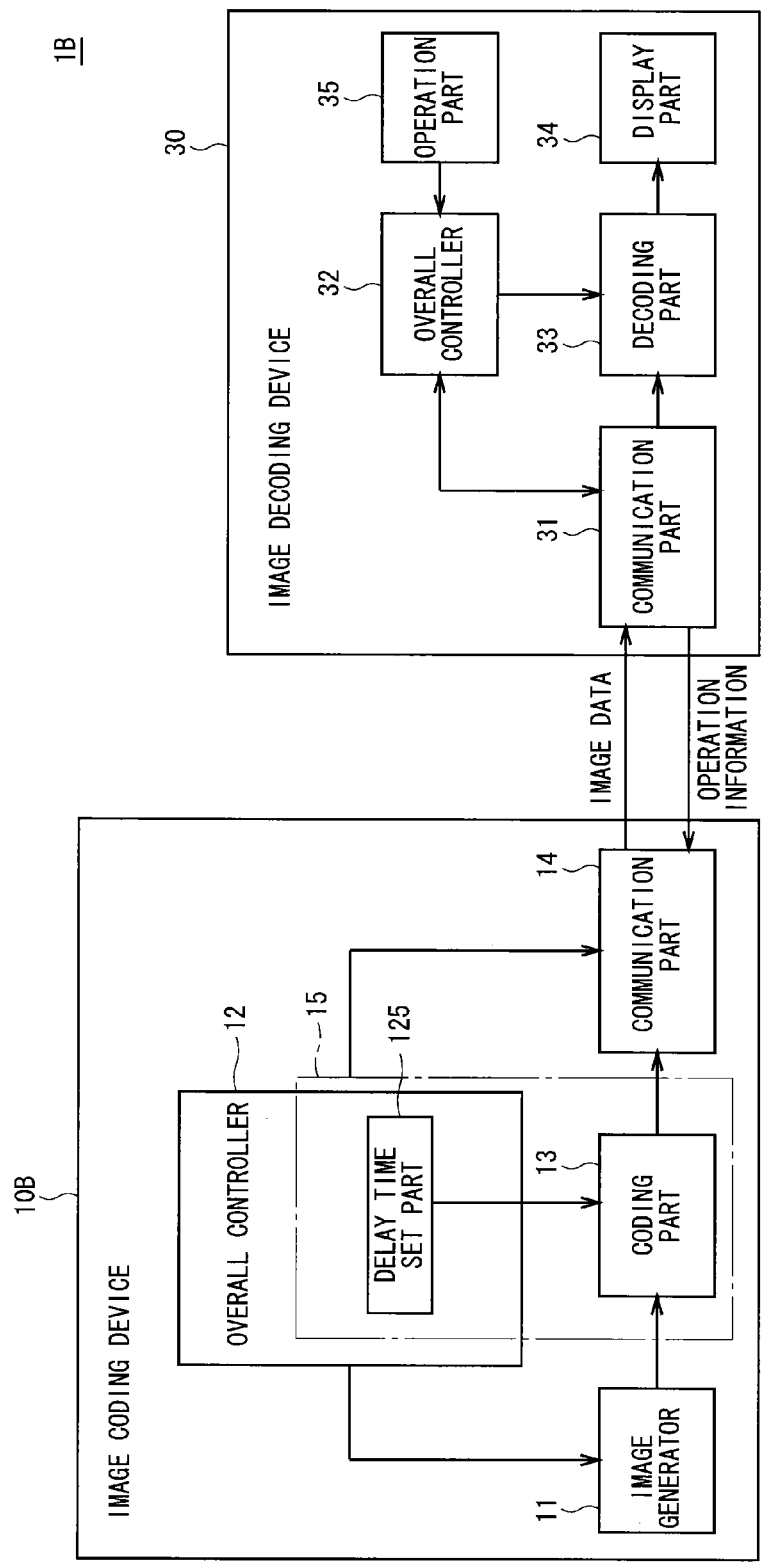
FIG. 15 A diagram showing a specific configuration of an image processing system according to a modification.

The image quality level and the delay time are correlated with each other. Accordingly, it may be also acceptable that information (delay time information) concerning a delay time (allowable delay time) allowed in displaying an image on the display part 34 is directly inputted to the coding part 13 (in more detail, to the code amount controller 220). FIG. 15 is a diagram showing a specific configuration of an image processing system 1B according to a modification.

To be specific, as shown in FIG. 15, in the image processing system 1B according to the modification, a delay time set part 125 is newly provided in the overall controller 12. The image quality controller 15 of the image processing system 1B is a function part achieved by cooperation of the delay time set part 125 and the coding part 13. The image coding device 10B is different from the image processing system 1 (see FIG. 2) of the above-described embodiment, in that the overall controller 12 includes the delay time set part 125 but does not include the image quality set part 121 and the coding condition set part 220. Except for these different points, the image processing system 1B has the same structure and the same function as those of the image processing system 1 of the above-described embodiment. Thus, the common parts are denoted by the common reference signs, and descriptions thereof are omitted.

The delay time set part 125 sets an allowable delay time in displaying an image on the display part 34 in accordance with the operation status of the image processing system 1B, and outputs delay time information concerning the allowable delay time that has been set. The delay time information is inputted to the code amount controller 220.

In the code amount controller 220, the unit coding area is identified based on the received delay time information, and the coding process is performed. Here, the identification of the unit coding area is achieved by using, for example, a table indicating the relationship between the delay time and the size of the unit coding area.

In the above-described embodiment, the image quality set part 121 identifies the non-operation period, and sets the image quality mode based on the identified non-operation period. However, this is not limiting. To be specific, the image quality set part 121 may set the image quality mode in accordance with the frequency at which non-operation occurs during the predetermined time period. Alternatively, both of the non-operation period and the frequency of non-operation may be used as indexes for changing the image quality mode.

Although three kinds of image quality modes are provided in the above-described embodiments, this is not limiting. The number of kinds of the image quality mode may be two, or may be four or more.

Figure 16:
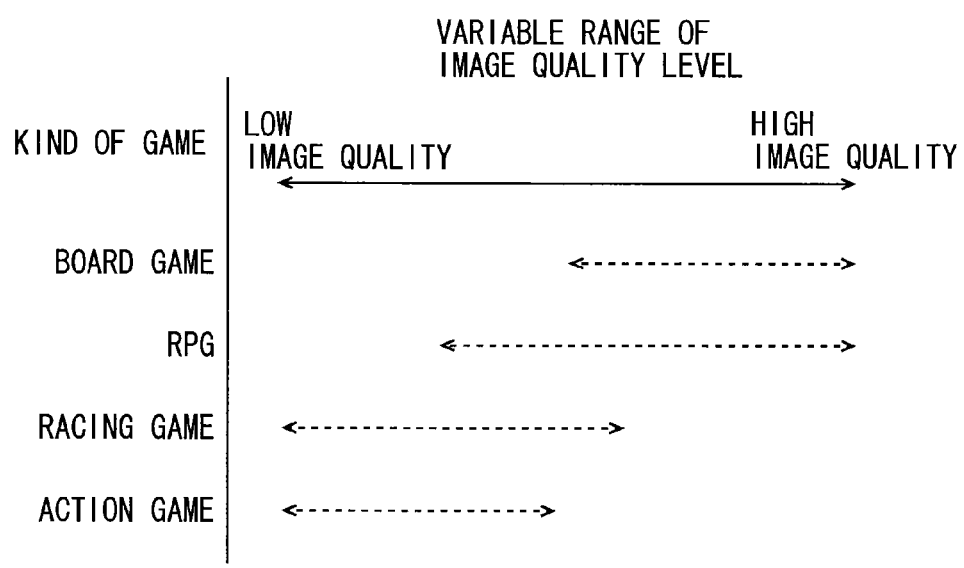
FIG. 16 A diagram showing the relationship between a game genre and a variable range of an image quality level.

It may be also possible that different variable ranges of the image quality level are set for different game genres. FIG. 16 is a diagram showing the relationship between the game genre and the variable range of the image quality level.

To be specific, as shown in FIG. 16, in a game (such as a board game and an RPG) that is assumed to involve a relatively small amount of operation, the image quality level is shifted to the high image quality side. In a game (such as a racing game and an action game) that is assumed to involve a relatively large amount of operation, the image quality level is shifted to the low image quality side, to reduce a delay time.

Setting the variable range of the image quality level in accordance with a game genre in this manner enables the user to enjoy a game with the most optimal image quality in accordance with the kind of the game.

In the above-described embodiments, the operation statuses (1) to (4) are illustrated as the operation status under which the image quality is changed. However, the image quality set part 121 may change the image quality level under another operation status (5) or upon detection of another operation status.

Another operation status (5-1) is, for example, a status in which the position of the viewpoint of viewing a 3D image is continuously moving in generation of the 3D image. More specifically, when a 3D image is generated, whether or not the position of the viewpoint of viewing this 3D image is moving is detected. In a case where the position of the viewpoint is continuously moving, the image quality mode is changed. A pattern of changing the image quality mode varies depending on whether or not the user has performed an operation at a time point a predetermined period prior to occurrence of the movement of the viewpoint.

In more detail, in the image generator 11 that generates a 3D image, the position of the viewpoint of viewing the 3D image is changed prior to 3D rendering, by means of viewing transformation that transforms a 3D space into a space viewed from a designated viewpoint. The image generator 11 detects whether or not the viewing transformation has been performed, and thereby detects a change in the position of the viewpoint. In a case where the image generator 11 has detected a continuous change in the position of the viewpoint, the image generator 11 outputs, to the overall controller 12, a signal indicating that the position of the viewpoint is continuously changing.

In a case where the signal indicating that the position of the viewpoint is continuously changing is received and additionally the user has performed an operation in a predetermined period before this signal is received, the overall controller 12 issues an image quality set command for shifting the image quality mode to the low image quality mode. In a case where the signal indicating that the position of the viewpoint is continuously changing is received and additionally the user has not performed an operation in the predetermined period before this signal is received, the overall controller 12 issues an image quality set command for shifting the image quality mode to the high-side image quality mode.

Thus, in a case where a continuous change in the position of the viewpoint is detected and additionally the user has performed an operation at a time point a predetermined period prior to occurrence of the movement of the viewpoint, the image quality mode is shifted to the low image quality mode. This enables an image to be smoothly displayed in response to the operation performed by the user.

In a case where a continuous change in the position of the viewpoint is detected and additionally the user has not performed an operation at a time point a predetermined period prior to occurrence of the movement of the viewpoint, the image quality mode is shifted to the high-side image quality mode, so that a delay of displaying an image is allowed. As a result, a delay of displaying an image is allowed under a status in which the amount of calculation processing performed at a time of compression is assumed to increase due to a large change in an image, that is, due to a change in the position of the viewpoint. This can reduce a load on the image coding device 10, and also can display an image with a high image quality. Here, as the status in which a continuous change in the position of the viewpoint is detected and additionally the user has not performed an operation in a predetermined period prior to occurrence of the movement of the viewpoint, for example, the following status is assumed. That is, in a golf game, a replay video image of a shot is played and displayed from the viewpoint of a flying ball. In this case, a video image with a high definition can be displayed.

Still another operation status (5-2) is, for example, a status in which the image coding device 10 is set such that it does not accept an input from the operation part 35 of the image decoding device 30. As a method for detecting such a status, for example, a method is adoptable in which an image quality set command for shifting the image quality mode to the high-side image quality mode is incorporated in a function that prevents the image coding device 10 from accepting an input from the operation part 35. More specifically, in a certain specific scene or state, the image coding device 10 may sometimes execute a function that prevents acceptance of an input from the operation part 35. Accordingly, since the image quality set command for shift the image quality mode to the high-side image quality mode is incorporated in such a function, the image quality mode can be shifted to the high-side image quality mode under a status in which the user does not perform an operation (more precisely, under a status in which, even when an operation is performed, this operation is not acceptable).

To the contrary, it may be possible that an image quality set command for shifting the image quality mode to the low image quality mode is incorporated in a function that causes the image coding device 10 to accept an input from the operation part 35. This enables the image quality mode to be smoothly shifted to the low image quality mode even in a case where a status is changed from the status not accepting an input from the operation part 35 to the status accepting an input from the operation part 35. The function that prevents the image coding device 10 from accepting an input from the operation part 35 and the function that cause the image coding device 10 to accept an input from the operation part 35 may be functions in the library contained in the SDK. In this case, the APIs of these functions are released to the programmer.

As a method for detecting another operation status (5-3) and controlling the image quality, for example, a method is adoptable in which the image quality level is controlled based on the motion vector that is detected by the inter-prediction part 215 of the coding part 13. The image quality set part 121 acquires information (inter-prediction information) concerning the motion vector from the coding part 13. Then, for example, when the motion vector is large, the image quality set part 12 shifts the image quality mode to the low image quality mode.

While the invention has been described in detail, the foregoing description is in all aspects illustrative and not restrictive. It is therefore understood that numerous modifications and variations not illustrated herein can be devised without departing from the scope of the invention.

DESCRIPTION OF REFERENCE NUMERALS 1, 1A, 1B image processing system
10, 10A, 10B image coding device (host device)
11 image generator
12 overall controller 13 coding part
15 image quality controller
30 image decoding device (client device)
34 display part
35 operation part
121 image quality set part
122 coding condition set part
125 delay time set part

We claim:

1. An image processing system comprising:
a host device that outputs image data; and
a client device including a display that displays an image based on said image data transmitted from said host device, wherein
said host device includes circuitry configured to:
control an image quality of an image displayed on said display in accordance with an operation status of said image processing system; and
in a case that said operation status is a status under which a delay of displaying an image which is caused by transmission of image data from said host device to said client device is allowed, increase an image quality of an image displayed on said display, the delay of displaying the image being a delay of a time at which a first frame of the image data is displayed on the display, wherein
said operation status under which said delay of displaying an image is allowed includes a status in which a scene is displayed on said display, said scene being an object to be viewed and listened to,
said host device includes a memory that stores a program for playing said scene,
in a source code of the program for playing said scene, a name of said scene is written as a comment,
said circuitry performs a preprocess prior to compiling that converts the comment concerning the name of said scene into a source code of an image quality set command for increasing said image quality, and
said circuitry sets said image quality in response to the image quality set command that is issued as a result of execution of said program that includes an object code generated from said source code.

2. The image processing system according to claim 1, wherein
said circuitry is further configured to:
set an image quality level of an image displayed on said display in accordance with said operation status, and output image quality information concerning the image quality level that has been set;
set a coding condition that is used in coding, based on said image quality information; and
perform a coding process on said image data based on said coding condition, and
in said operation status under which said delay of displaying an image is allowed, said circuitry outputs the image quality information for increasing said image quality level.

3. The image processing system according to claim 2, wherein
said circuitry is further configured to:
identify a unit coding area based on the image quality information and output said unit coding area as said coding condition, said unit coding area being a region within one frame of image data and indicating a range of management of the amount of generated codes generated by coding; and
determine a target amount of codes per one macro block based on said coding condition and control a quantization parameter, said macro block being obtained as a result of dividing one frame into a plurality of regions; and
perform a quantization process by using a quantization step that is determined in accordance with said quantization parameter, and generating coded image data.

4. The image processing system according to claim 3, wherein
said circuitry is further configured to determine the target amount of codes per one macro block included in said unit coding area such that the amount of generated codes for said unit coding area falls within a total target amount of codes for said unit coding area.

5. The image processing system according to claim 2, wherein
said client device includes second circuitry configured to perform a decoding process on image data transmitted from said host device, and
said image processing system separately and sequentially performs, on a unit coding area basis, said coding process, a transmission process of transmitting image data from said host device to said client device, and said decoding process.

6. The image processing system according to claim 2, wherein
said operation status under which said delay of displaying an image is allowed includes a status in which application software of a specific genre that requires a thinking time of a user who is visually checking said display is in execution.

7. The image processing system according to claim 6, wherein
said host device includes a memory that stores a function for issuing an image quality set command in accordance with a genre of application software,
said function is used in the application software of said specific genre,
in the application software of said specific genre, said specific genre is set as a parameter of said function, and
in a case that the image quality set command for increasing said image quality level is issued as a result of execution of the application software of said specific genre, said circuitry sets said image quality level in response to said image quality set command.

8. The image processing system according to claim 7, wherein
an API of the function for issuing the image quality set command in accordance with a genre of application software is released to a programmer.

9. The image processing system according to claim 6, wherein
said host device includes a memory that stores a first function and a second function, said first function being executed in an initialization process of application software, said second function being for issuing an image quality set command in accordance with a genre of application software that is set in a parameter of said first function,
said first function is used in the application software of said specific genre,
in the application software of said specific genre, said specific genre is set as the parameter of said first function,
said second function is executed as a result of execution of said first function, and in a case that an image quality set command for increasing said image quality level is issued as a result of execution of the application software of said specific genre, said circuitry sets said image quality level in response to said image quality set command.

10. The image processing system according to claim 9, wherein
an API of said first function is released to a programmer.

11. The image processing system according to claim 2, wherein
said operation status under which said delay of displaying an image is allowed includes a status in which said host device is reading data.

12. The image processing system according to claim 11, wherein
said host device includes a memory that stores a program for executing read-out of data,
an image quality set command for increasing said image quality level is incorporated in said program, and
in a case that the image quality set command is issued as a result of execution of said program, said circuitry sets said image quality level in response to said image quality set command.

13. The image processing system according to claim 12, wherein
the program for executing read-out of data is configured as a function, and
an API of said function is released to a programmer.

14. The image processing system according to claim 11, wherein
the status in which said host device is reading data includes a status in which said host device is reading data from an external storage medium that is attached to said host device.

15. The image processing system according to claim 2, wherein
said client device includes second circuitry configured to detect a user's operation on said client device, and
said operation status under which said delay of displaying an image is allowed includes a status in which an amount of user's operation detected by said second circuitry is equal to or less than a predetermined amount.

16. The image processing system according to claim 15, wherein
said client device transmits, as operation information, information detected by said second circuitry to said host device, and
in a case where a non-operation period identified based on said operation information is equal to or longer than a predetermined period, said circuitry outputs the image quality information for increasing said image quality level.

17. The image processing system according to claim 15, wherein
said client device transmits, as operation information, information detected by said second circuitry to said host device,
said circuitry monitors a user's operation on said client device based on said operation information, and
in a case where the amount of user's operation is equal to or larger than a predetermined amount, said second circuitry outputs an image quality set command for lowering said image quality level, and in a case where the amount of user's operation is less than the predetermined amount, said second circuitry outputs an image quality set command for increasing said image quality level.

18. The image processing system according to claim 15, wherein
said host device includes a memory that stores a program for executing a predetermined event at a time point prior to a scene change time point at which a scene is changed from a scene not requesting a user's operation to a scene requesting a user's operation,
an image quality set command for lowering said image quality level is incorporated in said program, and
when the image quality set command is issued as a result of execution of said program, said circuitry sets said image quality level in response to said image quality set command.

19. The image processing system according to claim 18, wherein
the program for executing said predetermined event is configured as a function, and
an API of said function is released to a programmer.

20. The image processing system according to claim 15, wherein
said host device includes a memory that stores a program for executing an event at a scene change time point at which a scene is changed from a scene not requesting a user's operation to a scene requesting a user's operation,
a source code of the program for executing an event at said scene change time point includes a special command for, when the source code is compiled, placing an image quality set command for lowering said image quality level at a time point a predetermined time period prior to said scene change time point, and
when the image quality set command is issued as a result of execution of said program that includes an object code generated by compiling of said source code, said circuitry sets said image quality level in response to said image quality set command.

21. The image processing system according to claim 20, wherein
the program for executing an event at said scene change time point is configured as a function, and
an API of said function is released to a programmer.

22. The image processing system according to claim 2, wherein
said circuitry outputs image quality information for lowering the image quality level at a time point prior to a time point when the operation status is changed from an operation status under which said delay of displaying an image is allowed to an operation status under which said delay of displaying an image is not allowed.

23. The image processing system according to claim 2, wherein
said client device includes second circuitry configured to detect a user's operation on said client device,
said client device transmits, as operation information, information detected by said second circuitry to said host device, and
said operation status under which said delay of displaying an image is allowed includes a status in which said host device is set such that said host device does not accept an instruction based on said operation information.

24. The image processing system according to claim 23, wherein
said host device includes a memory that stores a program for preventing acceptance of an instruction based on said operation information,
an image quality set command for increasing said image quality level is incorporated in said program, and when the image quality set command is issued as a result of execution of said program, said circuitry sets said image quality level in response to said image quality set command.

25. The image processing system according to claim 24, wherein
the program for preventing acceptance of an instruction based on said operation information is configured as a function, and
an API of said function is released to a programmer.

26. The image processing system according to claim 2, wherein
said circuitry is configured to generate a 3D image,
said client device includes second circuitry configured to detect a user's operation on said client device,
said client device transmits, as operation information, information detected by said second circuitry to said host device,
in a case where viewing transformation that continuously changes the position of a viewpoint is performed in generation of a 3D image, said circuitry outputs a signal indicating that the position of the viewpoint is continuously changing, and
in a case where a user's operation performed in a predetermined period prior to reception of the signal indicating that the position of the viewpoint is continuously changing is detected based on said operation information, said circuitry outputs the image quality information for lowering said image quality level.

27. The image processing system according to claim 1, wherein
said host device includes a memory that stores a program for playing said scene,
an image quality set command for increasing said image quality level is incorporated in said program, and
in a case that the image quality set command is issued as a result of execution of said program, said circuitry sets said image quality level in response to said image quality set command.

28. The image processing system according to claim 27, wherein
the program for playing said scene is configured as a function, and
an API (Application Program Interface) of said function is released to a programmer.

29. The image processing system according to claim 1, wherein
said circuitry included in said host device is configured to:
set an image quality level of an image displayed on said display in accordance with said operation status;
output image quality information concerning the image quality level that has been set;
perform a coding process on said image data based on said image quality information;
identify a unit coding area based on said image quality information, determine a target amount of codes per one macro block based on said unit coding area, and control a quantization parameter, said unit coding area being a region within one frame of image data and indicating a range of management of the amount of generated codes generated by coding, said macro block being obtained as a result of dividing one frame into a plurality of regions; and
perform a quantization process by using a quantization step that is determined in accordance with said quantization parameter, and generating coded image data.

30. The image processing system according to claim 1, wherein
said circuitry included in said host device is configured to:
set an allowable delay time of displaying an image on said display in accordance with said operation status, and output delay time information concerning the allowable delay time that has been set;
perform a coding process on said image data based on said delay time information;
identify a unit coding area based on said delay time information, determine a target amount of codes per one macro block based on said unit coding area, and control a quantization parameter, said unit coding area being a region within one frame of image data and indicating a range of management of the amount of generated codes generated by coding, said macro block being obtained as a result of dividing one frame into a plurality of regions; and
perform a quantization process by using a quantization step that is determined in accordance with said quantization parameter, and generating coded image data.

31. An image processing system comprising:
a host device that outputs image data; and
a client device including a display that displays an image based on said image data transmitted from said host device, wherein
said host device includes circuitry configured to:
control an image quality of an image displayed on said display in accordance with an operation status of said image processing system; and
in a case that said operation status is a status under which a delay of displaying an image which is caused by transmission of image data from said host device to said client device is allowed, increase an image quality of an image displayed on said display, the delay of displaying the image being a delay of a time at which a first frame of the image data is displayed on the display, wherein
said operation status under which said delay of displaying an image is allowed includes a status in which application software of a specific genre that requires a thinking time of a user who is visually checking said display is in execution,
in a source code of the application software of said specific genre, said specific genre is written as a comment,
said circuitry performs a preprocess prior to compiling that converts the comment concerning said specific genre into a source code of the image quality set command for increasing said image quality level, and
said circuitry sets said image quality level in response to said image quality set command that is issued as a result of execution of the application software of said specific genre that includes an object code generated from said source code.

32. An image processing system comprising:
a host device that outputs image data; and
a client device including a display that displays an image based on said image data transmitted from said host device, wherein
said host device includes circuitry configured to:
control an image quality of an image displayed on said display in accordance with an operation status of said image processing system; and
in a case that said operation status is a status under which a delay of displaying an image which is caused by transmission of image data from said host device to said client device is allowed, increase an image quality of an image displayed on said display, the delay of displaying the image being a delay of a time at which a first frame of the image data is displayed on the display, wherein said client device includes second circuitry configured to detect a user's operation on said client device, and said operation status under which said delay of displaying an image is allowed includes a status in which an amount of user's operation detected by said second circuitry is equal to or less than a predetermined amount, said second circuitry includes a detection sensor that detects a movement of said client device caused by a user, said client device transmits, to said host device, operation information including information detected by said detection sensor, and in a case where the amount of movement of said client device identified based on the information detected by said detection sensor remains unchanged over a predetermined time period, said circuitry increases said image quality level.

33. An image processing system comprising:

a host device that outputs image data; and a client device including a display that displays an image based on said image data transmitted from said host device, wherein said host device includes circuitry configured to:
control an image quality of an image displayed on said display in accordance with an operation status of said image processing system; and in a case that said operation status is a status under which a delay of displaying an image which is caused by transmission of image data from said host device to said client device is allowed, increase an image quality of an image displayed on said display, the delay of displaying the image being a delay of a time at which a first frame of the image data is displayed on the display, wherein said circuitry is configured to generate a 3D image, said client device includes second circuitry configured to detect a user's operation on said client device, and said operation status under which said delay of displaying an image is allowed includes a status in which the position of a viewpoint of viewing said 3D image generated by said circuitry is moving and additionally said second circuitry has not detected a user's operation in a predetermined period prior to occurrence of the movement of the position of the viewpoint.

34. The image processing system according to claim 33, wherein said client device transmits information detected by said second circuitry, which serves as operation information, to said host device, in a case where viewing transformation that continuously changes the position of said viewpoint is performed in generation of a 3D image, said circuitry outputs, to said second circuitry, a signal indicating that the position of the viewpoint is continuously changing, and in a case where a user's operation performed in a predetermined period prior to reception of the signal indicating that the position of the viewpoint is continuously changing is not detected based on said operation information, said second circuitry outputs image quality information for increasing said image quality level.

35. A host device comprising:
circuitry configured to:
generate image data of an image to be displayed on a display of a client device, and output said image data;

control an image quality of an image displayed on said display in accordance with an operation status of an image processing system that includes said host device and said client device; and increase the image quality of said image in a case that said operation status is a status under which a delay of displaying an image which is caused by transmission of image data from said host device to said client device is allowed, the delay of displaying the image being a delay of a time at which a first frame of the image data is displayed on the display, wherein said operation status under which said delay of displaying an image is allowed includes a status in which a scene is displayed on said display part, said scene being an object to be viewed and listened to, said host device includes a memory that stores a program for playing said scene, in a source code of the program for playing said scene, a name of said scene is written as a comment, said circuitry performs a preprocess prior to compiling that converts the comment concerning the name of said scene into a source code of an image quality set command for increasing said image quality, and said circuitry sets said image quality in response to the image quality set command that is issued as a result of execution of said program that includes an object code generated from said source code.

36. A method for operating an image processing system including a host device that outputs image data and a client device having a display that displays an image based on said image data transmitted from said host device, said method comprising:

(a) in said host device, recognizing an operation status of said image processing system; and (b) in a case where an operation status under which a delay of displaying an image which is caused by transmission of image data from said host device to said client device is allowed is recognized in said step (a), increasing an image quality of an image displayed on said display, the delay of displaying the image being a delay of a time at which a first frame of the image data is displayed on the display, wherein said operation status under which said delay of displaying an image is allowed includes a status in which a scene is displayed on said display, said scene being an object to be viewed and listened to, said host device includes a memory that stores a program for playing said scene, in a source code of the program for playing said scene, a name of said scene is written as a comment, said method further comprising performing a preprocess prior to compiling that converts the comment concerning the name of said scene into a source code of an image quality set command for increasing said image quality, and said method further comprising setting said image quality in response to the image quality set command that is issued as a result of execution of said program that includes an object code generated from said source code.

37. The method for operating the image processing system according to claim 36, further comprising:

setting an image quality level of an image displayed on said display in accordance with the operation status, and outputting image quality information concerning the image quality level that has been set;

setting a coding condition that is used in coding, based on said image quality information; and performing a coding process on said image data based on said coding condition, wherein in said setting of the image quality level, the image quality information for increasing said image quality level is outputted in said operation status under which said delay of displaying an image is allowed.

38. The method for operating the image processing system according to claim 37, wherein in said setting of the coding condition, a unit coding area is identified based on the image quality information and said unit coding area is outputted as said coding condition, said unit coding area being a region within one frame of image data and indicating a range of management of the amount of generated codes generated by coding, said performing of the coding process includes:

determining a target amount of codes per one macro block based on said coding condition and controlling a quantization parameter, said macro block being obtained as a result of dividing one frame into a plurality of regions; and performing a quantization process by using a quantization step that is determined in accordance with said quantization parameter, and generating coded image data.

39. The method for operating the image processing system according to claim 38, wherein in said determining of the target amount, the target amount of codes per one macro block included in said unit coding area is determined such that the amount of generated codes for said unit coding area falls within a total target amount of codes for said unit coding area.

40. The method for operating the image processing system according to claim 37, further comprising performing, in said client device, a decoding process on image data transmitted from said host device, wherein in said image processing system, said coding process, a transmission process of transmitting image data from said host device to said client device, and said decoding process are separately and sequentially performed on a unit coding area basis.

41. The method for operating the image processing system according to claim 37, wherein in said setting of the image quality level, image quality information for lowering the image quality level is outputted at a time point prior to a time point when the operation status is changed from an operation status under which said delay of displaying an image is allowed to an operation status under which said delay of displaying an image is not allowed.

42. A method for making a program stored in a storage part of a host device of an image processing system including said host device that outputs image data and a client device having a display part that displays an image based on said image data transmitted from said host device, said method comprising the steps of:

by a preprocessor that performs a preprocess prior to compiling, converting a comment indicating a name of a scene, which is written in a source code of a program for playing said scene, into a source code of an image quality set command for increasing an image quality level of an image displayed on said display part, said scene being an object to be viewed and listened to; and by compiling, generating from said source code a program including an object code of said image quality set command for increasing the image quality level.

43. A method for making a program stored in a storage part of a host device of an image processing system including said host device that outputs image data and a client device having a display part that displays an image based on said image data transmitted from said host device, said method comprising the steps of:

by a preprocessor that performs a preprocess prior to compiling, converting a comment indicating a specific genre, which is written in a source code of application software of said specific genre, into a source code of an image quality set command for increasing an image quality level of an image displayed on said display part; and by compiling, generating from said source code a program including an object code of said image quality set command for increasing the image quality level.

44. A method for making a program stored in a storage part of a host device of an image processing system including said host device that outputs image data and a client device having a display that displays an image based on said image data transmitted from said host device, said method comprising the step of compiling a first source code of the program that executes a first event at a scene change time point at which a scene is changed from a scene not requesting a user's operation to a scene requesting a user's operation, said first source code including a first special command for, when said step of compiling the first source code is executed, placing a first image quality set command for lowering an image quality level of an image displayed on said display at a time point a predetermined time period prior to said scene change time point, and said method further comprising the step of compiling a second source code of the program that executes a second event at a time point at which an operation status is changed from an operation status under which a delay of displaying an image which is caused by transmission of image data from said host device to said client device is not allowed to an operation status under which the delay is allowed, said second source code including a second special command for, at the time point, placing a second image quality set command for increasing the image quality level of the image displayed on said display, the delay of displaying the image being a delay of a time at which a first frame of the image data is displayed on the display, said operation status under which said delay of displaying an image is allowed including a status in which a scene is displayed on said display, said scene being an object to be viewed and listened to, wherein in said second source code, a name of said scene is written as a comment, said host device performs a preprocess prior to compiling that converts the comment concerning the name of said scene into the second source code of the second image quality set command for increasing said image quality level, and said host device sets said image quality level in response to the second image quality set command that is issued as a result of execution of said program that includes an object code generated from said second source code.

\* \* \* \* \*